US008568664B2

(12) United States Patent
Francis, Jr. et al.

(10) Patent No.: US 8,568,664 B2
(45) Date of Patent: Oct. 29, 2013

(54) MODULAR QUAD CELL ELECTRO-MECHANICAL OZONE GENERATION DEVICE

(76) Inventors: Ralph M. Francis, Jr., Racine, WI (US); John C. Mastopietro, Racine, WI (US); Anthony J. Mastopietro, Racine, WI (US)

(*) Notice: Subject to any disclaimer, the term of this patent is extended or adjusted under 35 U.S.C. 154(b) by 133 days.

(21) Appl. No.: 12/883,151

(22) Filed: Sep. 15, 2010

(65) Prior Publication Data

US 2011/0064621 A1 Mar. 17, 2011

Related U.S. Application Data

(60) Provisional application No. 61/243,157, filed on Sep. 17, 2009.

(51) Int. Cl.
*B01J 19/08* (2006.01)
(52) U.S. Cl.
USPC .............................. 422/186.07; 422/186.11
(58) Field of Classification Search
USPC ............................ 422/186.07, 186.2, 186.11
See application file for complete search history.

(56) References Cited

U.S. PATENT DOCUMENTS

| 3,973,133 | A | * | 8/1976 | Emigh et al. | 422/186.11 |
| 5,427,693 | A | * | 6/1995 | Mausgrover et al. | 210/739 |
| 5,637,279 | A | * | 6/1997 | Besen et al. | 422/186.07 |
| 6,994,832 | B2 | * | 2/2006 | Borgstrom | 422/186.19 |
| 7,943,098 | B2 | * | 5/2011 | Phillips et al. | 422/186.07 |

* cited by examiner

*Primary Examiner* — Kishor Mayekar
(74) *Attorney, Agent, or Firm* — The Livingston Firm; Edward M. Livingston, Esq.; Bryan L. Loeffler, Esq.

(57) ABSTRACT

An ozone generation system includes a plurality of modular ozone generating devices, each having an upper and lower housing. The upper housing encloses electrical components for providing high energy power to ozone generator cells of each device to produce an ozone generation output. The lower housing is formed by a multiplicity of section layers enclosing the ozone generator cells and an internal liquid coolant system. Each ozone generator cell has two plasma generation pathways. An orifice is formed in on each one ozone generator cell for maintaining a known and controllable pressure drop across each ozone generator cell. A plurality of ports formed in a center body framing element of the lower housing provides porting for the water in and out, oxygen in and ozone out. The modular devices can be combined on racks having a common manifold system for forming a rack of ozone producing devices for outputting a high yield of ozone.

34 Claims, 27 Drawing Sheets

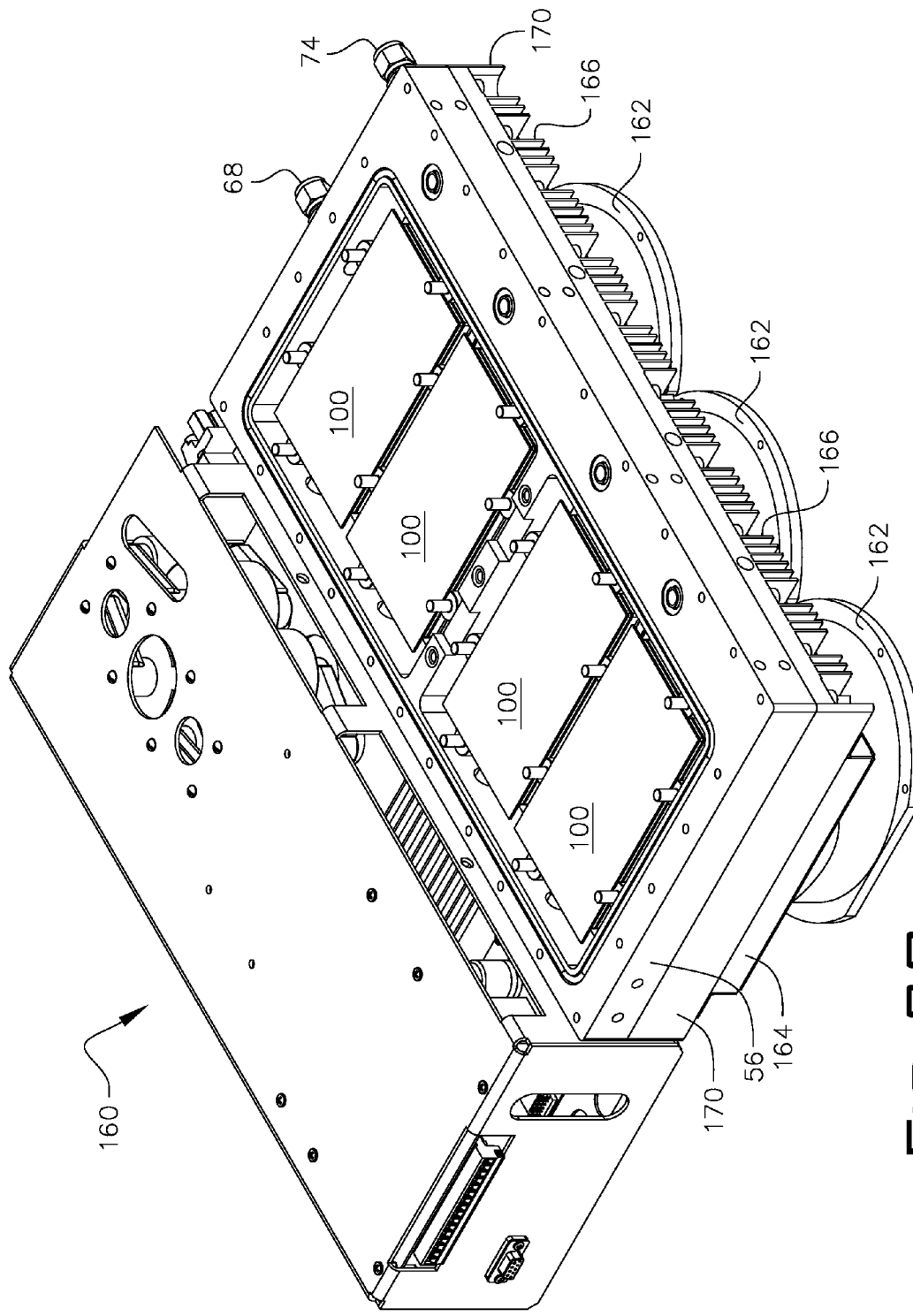

MODULAR QUAD CELL ELECTRO-MECHANICAL OZONE GENERATION DEVICE

PRIOR APPLICATIONS

This U.S. non-provisional patent application is a continuation-in-part of U.S. provisional patent application No. 61/243,157, filed Sep. 17, 2009.

BACKGROUND OF THE INVENTION

1. Field of Invention

This invention relates to a modular quad cell, electro-mechanical ozone generator device and system. More particularly, it relates to a highly-concentrated output modular ozone generator system having four generator cells in each modular ozone generator, which can be combined onto trays forming a rack of ozone generators for providing a high concentration, high output yield of liquid or air-cooled ozone for a multitude of industrial, commercial and military purposes.

2. Description of the Prior Art

Modular ozone generator systems that can be combined to form blocks of generators are known in the prior art. For example, U.S. Pat. No. 6,599,486 to Borgstrom discloses an ozone generator system in which a multitude of plate-type ozone generators are arranged adjacent to each other in a block. Each ozone generator comprises a chamber, adapted for converting oxygen to ozone by a corona discharge, and each chamber is provided with an inlet for oxygen or an oxygen-rich gas and an outlet for ozone. The ozone generators are arranged in a block module in which they are affixed by a block rack. The block rack comprises an inlet port adapted for introduction of oxygen gas, and an outlet port adapted for discharge of ozone created through conversion within the generators comprised in the block module. A multitude of first conduits, each running between said inlet port and one chamber inlet, and a multitude of second conduits, each running between said outlet port and one chamber outlet, are provided within said block rack. However, each modular ozone generator system of this prior art reference employs only a single generator cell with only a single plasma pathway within each module. Further, Borgstrom requires that the flow path of each and every one of the ozone generators in the block module be substantially the same. A micro-channel network would not require such and would therefore be an improvement over the prior art of a modular ozone generator unit and/or system.

U.S. Pat. No. 6,994,832 also to Borgstrom discloses another modular ozone generator system and claims priority to Borgstrom's other earlier issued patent described above (the '486 patent). This second Borgstrom reference discloses an ozone generator system having a multitude of plate type ozone generators arranged adjacent to each other in a block. Each ozone generator includes a chamber, adapted for converting oxygen to ozone by a corona discharge; each chamber is provided with an inlet for oxygen or an oxygen-rich gas and an outlet for ozone. The ozone generators are arranged in a block module in which they are affixed by a block rack. The block rack includes an inlet port adapted for introduction of oxygen gas, and an outlet port adapted for discharge of ozone created through conversion within the generators of the block module. A multitude of first conduits, each running between the inlet port and one chamber inlet, and a multitude of second conduits, each running between the outlet port and one chamber outlet, are provided within the block rack. The conduits are arranged so that the flow paths and distance between the inlet and outlet ports have the same length, regardless of which generator the introduced gas passes through, thereby achieving an even gas pressure and gas flow, through parallel connection of the generators. However, as in the other Borgstrom reference each modular generator only contains a single ozone generator cell and each cell is only a single ozone generating unit (see FIG. 1 of Borgstrom '832). Further, this, nor the other Borgstrom reference above, disclose, teach or suggest the use of an internal liquid coolant micro-channel network juxtaposed to the ozone generating discharge plates. Still further, this, nor the other Borgstrom reference above disclose, teach or suggest the use of an equalizing pressure means, such as spring plates and Teflon locators, within the ozone cells to normalize and keep the pressure constant in each modular generator. And this is critically needed in any modular block ozone generation system and something that clearly needs improvement upon over the Borgstrom inventions. Finally, this Borgstrom invention requires that the electronic unit be mounted on the block rack. This is a disadvantage as locally employed electronics within each individual ozone generating cell would allow greater control and would be a clear improvement over the prior art.

US Published Application No. 2005/0161318 to Arlemark discloses a method and apparatus for improving the yield of ozone gas in a closed ozone generator unit. In this closed ozone generator unit, oxygen gas is transformed into ozone gas by means of alternating current, the oxygen gas being substantially pressurized before entry into the unit. The unit is exposed to an external pressure substantially equal to or higher than the pressure of the oxygen gas. This unit employs two ceramic plates forming a closed space containing a metal electrode, supplied with alternating current for transforming supplied oxygen gas into ozone gas. The generator unit may be submerged in water to act as a cooling liquid and as a second pole; a metal electrode within the unit acts as a first pole. In this practical design the water has a pressure equal to or higher than the pressure of the oxygen gas. This ozone generator system is considered "water cooled" but it is a "wet cooled system and does not disclose, suggest or teach the use of a liquid coolant system employing a liquid micro-channel network formed on a section layer positioned juxtaposed to the generator cell to affectively cool the ozone being produced. Further, although this reference discloses that four ozone generator assemblies are arranged in a container, this reference does not contemplate placing four individual ozone producing cells within a single modular unit, wherein each module can then be made part of a larger rack system of more than one module, to form a cube or network of modules. Therefore, this prior art reference fails in an area of great need.

U.S. Pat. No. 6,869,575 to Tabata et al. discloses a small-sized ozonizer capable of generating highly concentrated ozone with a high generating efficiency. The ozonizer has a low voltage electrode that includes a disc-shaped low voltage electrode main body facing a high voltage electrode and an extension at one side of the low voltage electrode main body. The extensions are laminated in layers on a base via blocks and contain a coolant inlet portion for supplying coolant to a coolant passage. Also included are a coolant outlet portion for exhausting coolant from the coolant passage and an ozone gas outlet portion for exhausting ozone gas from the ozone gas passage pass through the extensions and the blocks, respectively, in a laminating direction of the discharge cells. Like Arlemark, or any other prior art reference, Tabata et al. does not disclose, suggest or teach placing four individual ozone producing cells within a single modular unit, wherein each module can then be made part of a rack. Further, although Tabata et al. speaks to coolant passages, it fails to disclose the use of a liquid coolant plate or layer section mounted within a center body framing element that is positioned juxtaposed to the ozone generating cells of a modular ozone generation system, of which the liquid coolant plate employs a micro-channel network for passing a liquid coolant there through (i.e., liquid) to significantly reduce the temperature of the ozone being produced there within. And therefore, improvement is clearly needed.

U.S. Pat. No. 7,198,765 to Tabata et al. discloses a flat plate laminate ozone generating apparatus including a plurality of laminated plate-shaped high voltage electrodes and low voltage electrodes between which an alternating voltage is applied to produce a discharge and generate ozone gas, and in particular, to an ozonizer which is an essential portion of the flat plate laminate ozone generating apparatus and which includes the high voltage electrodes and low voltage electrodes and to which a gas containing oxygen is supplied to generate ozone gas, and also in particular, to a construction of the ozonizer which is thin, of a large capacity and in which the number of components may be reduced while also making the apparatus small in size. In one embodiment Tabata '765 discloses that the ozone generating apparatus of this invention has a plurality of ozonizers employed in a single housing so that it may be an ozone generating apparatus of further increased capacity, reduced size and may manufactured and maintained at a reduced cost. However, nowhere in this reference is it disclosed, suggested or taught that the single ozonizer can be made to be a modular unit, enclosing a multitude of ozone generating cells, which can then be combined in a tray to form a rack. Further, nowhere in this Tabata reference does it disclose, let alone teach or suggest, the use of a liquid coolant plate that employs a micro-channel network system for passing a liquid coolant there through (such as water) to significantly reduce the temperature of the ozone being produced there within. Further, in both of the above Tabata prior art references the use of conductive film on a second electrode is required. An ozone generating system not employing such films is needed and so therefore, both of these Tabata inventions clearly need to be improved.

U.S. Pat. No. 5,932,180 to Zhang et al. discloses a reactive gas generator cell that includes a high voltage assembly having a high voltage electrode plate and a low voltage assembly having a low voltage electrode plate. Each of the high and low voltage assemblies includes a cover plate and a channel plate. A welded metallic seal may join the high voltage assembly and the low voltage assembly to create a permanently sealed chamber between the assemblies. A refractory metal surface, which may be a tungsten surface, is disposed on at least one of the low voltage electrode plate and the high voltage electrode plate. A dielectric barrier is disposed between the high voltage electrode plate and the low voltage electrode plate. A discharge region for confining a reactive gas is defined, at least in part, by the refractory metal surface and a surface of the dielectric barrier. A spacer, which may be formed from a refractory material, may be positioned between the surface of the dielectric barrier and the refractory metal surface to define a predetermined gap. However, Zhang relies on the use of a conductive coating on a surface opposite of the dielectric. This needs improvement. The conductive coatings need to be removed completely.

U.S. Pat. No. 6,726,885 to Borgstrom discloses an apparatus and method for ozone generation and a method for generating ozone by exposing oxygen to high frequency alternating current with high voltage over a dielectric. The apparatus comprises a pressure compensation admitting unit joined together by at least two plates of a dielectric material and positioned there between a present electrode on which a high frequency alternating current with high voltage is applied, and two sealed spaces for generation of ozone on opposite sides of the unit, whereby the respective sealed space, on the opposite side of said plate of dielectric material, is delimited by an earthed and cooled electrode, through which oxygen gas or gas rich in oxygen is supplied to the space and ozone is conducted out of the same. By means of this apparatus, oxygen gas or gas rich in oxygen can be conducted under pressure into sealed chambers on opposite sides of the pressure compensation admitting unit. Although Borgstrom in this reference tries to deal with the issue of providing an equal uniform pressure distribution over the delimiting surfaces of the gas chamber, it does not deal with pressure changes in a modular ozone generator system wherein each module has more than one cell and wherein each cell is comprised of two sub-cells and further wherein a pressure change within said module is normalized across all generating cells by a center stainless steel plate member having spring members for normalizing said pressure to the required value. Such improvement is clearly needed.

U.S. Pat. No. 6,905,659 to Usui et al. discloses a flat plate laminate ozone generating device having a plurality of laminated plate-shaped high and low voltage electrodes, between which an alternating voltage is applied, to produce a discharge and thereby generate ozone gas. This prior art reference discloses the use of a cooling liquid passage. However, the liquid passage is constructed from highly insulated flow tubes formed through the high voltage electrode. This makes for a difficult device to construct and also a difficult device to repair if any of the flow tube insulation breaks down and needs to be replaced. In such scenario, the high voltage electrode has to be taken off line and removed form the ozone generating device. The placement of a liquid coolant passage through the high voltage electrode is of poor design and clearly needs improvement thereupon. A cooing system, be it an air or liquid coolant system, employed in close proximity of the high voltage electrode would be a far superior device and is one not contemplated by Usui et al.

U.S. Pat. No. 5,942,196 to Tabata et al. discloses another ozone generating apparatus, but one employed for large capacity gas generation in a more compact configuration. This is realized by stacking discharge cells inside one housing and further wherein only one oxygen source feeds each of the discharge cells. At first glance this appears to be a major improvement over the prior art of large capacity, but small configuration ozone generation devices. However, what is not contemplated, let alone disclosed, taught or suggested, is what to do with the excess heat generated by such a device. A major factor in designing and implementing large capacity, small configuration ozone generating device, is the issue of heart dissipation. Nowhere in this particular reference does it disclose how the device eliminates the incredible amount of heat that would be generated by such a purportedly large capacity device. What can therefore be gathered is that the device does not produce a significant amount of heat and therefore its statement to being large capacity is disingenuous at best. Admittedly this prior art reference contains multiple cells stacked within a small housing. However, it can not produce the large capacity output, which it purportedly produces unless it employs an integral cooling system, which it clearly does not. So, although it moves the prior art forward in designing a compact ozone generation unit, it can not be said to be a "large capacity" unit because it fails to properly provide for heat dissipation through some form of a cooling system and therefore falls way short of improving the art of large capacity, small configuration ozone generation units.

The prior art as a whole has attempted to improve upon the ozone generation art, which beckons for higher concentration ozone at high yield amounts per unit volume, in smaller configured units or modules, but which has fallen short of this important objective. The prior art has shown that reduction in the size of the ozone generation units and the use of modular units in trays and blocks is advantageous. And admittedly, some improvements have been realized. However, further improvement is clearly needed. For example, nowhere in the prior art has any ozone generator been able to produce a modular unit having four generating cells within one small modular unit, the same which could then be used in a tray that forms a rack. This is clearly needed. Further, nowhere in the prior art has any invention used a liquid cooling plate or section layer having an internal coolant micro-channel network that is positioned juxtaposed to the plasma generating plates for dealing with the high level of bi-product heat generation cause din module or compact units. Still further, nowhere in the prior art has any modular unit been programmed to be completely self-diagnostic and having an instant on feature such that ozone can be produced at the very moment of start up. Each of the prior art devices known require a start up wait period, which translates into a significant loss of time in ozone production (and therefore a loss of efficiency) when considering large commercial and industrial applications and which is totally unacceptable for military uses.

Therefore, improvement over the prior art is clearly needed and such improvement will be discussed herein below in the Summary of the Invention and the Detailed Description, considered in combination with the Figures included herewith.

SUMMARY OF THE INVENTION

We have invented a quad cell, internally liquid cooled (preferred cooling system), modular electro-mechanical ozone generation device that is a vast improvement over the prior art. Our device has an upper and lower housing and is formed as a module for combining with other like modules onto trays, which then forms a rack of modules, resulting in a very high output per unit of volume, high yielding ozone generation system for use in large commercial and industrial applications and for military use. The primary use of the present invention is to substantially sanitize large volumes of liquid or other liquids, but it can also be used to substantially sanitize, treat and/or disinfect large air volumes as well.

Each module in its preferred embodiment contains four ozone generating cells within the lower housing and each of the ozone generating cells is made up of two plasma discharge ozone generating pathways (so called "sub-cells") that are layered together (see FIG. 2). The ozone generating cells employ a novel reverse plate formation such that the low-potential or negative electrode of each sub-cell of each ozone generating cell of the four cells of each module are in a parallel but close proximity to one another within the cell, opposite external surfaces, while the high-potential or positive electrodes of each sub-cell of each ozone generating cell of the four cells of each module are in a parallel, but in a distal relationship from one another (i.e., are on an outer side—see FIG. 2 again). In a preferred embodiment, four cells, each made up of two sub-cells are employed in each module. However, nothing herein limits that only one, two or three cells are used and still further nothing herein limits that each individual generating cell be made up of two sub-cells. In other words, a host of other variable numbered configurations as to the cells and sub-cells can be employed within the present invention.

The upper housing encloses all of the electronics that power and drive the module while the lower housing contains the ozone generating cells, an internal liquid coolant system, a spring plate forced distribution and equalization system, Teflon locators or locators of equally durable material, working in coincidence with the forced distribution and equalization system, an orifice system for maintaining a known and controllable pressure drop across the generation cells, a center body framing element for locating and separating the four ozone generating cells into two pair, as well as liquid coolant inlet and outlet ports, an oxygen inlet port and an ozone outlet port. On either side of the negative electrodes is the internal coolant system formed from a machined plate structure, which forms one of a multitude of section layers making up the lower housing. Each coolant system contains an inlet portion that connects to a liquid manifold (in the preferred embodiment) that is in communication with the inlet port of the center body framing element. The liquid coolant system has a plurality of fins formed therein for moving liquid over the plasma generator (one each on each side of each sub-cell of any one generating cell of the four contained within a module) for removing heat during ozone production therein and for moving excess heat out of the modular ozone generating system. This unique internal cooling system allows the ozone to be cooled as it leaves any given module. Further, the fact that the micro-channel networks for the ozone production is positioned on the opposite side of the ceramic plates helps to keep the system completely dry. This permits the compact size as seen in the present invention, all the while producing a very large capacity output of ozone that could never be accomplished in the prior art as previously discussed in the background of the Invention.

Each module can slide into a single slot of a tray, wherein each slot has a pair of locating pins and an electrical connection block located at a top portion thereof. The module locating pins and the electrical connection block are formed as one floating piece that permit a slight amount of movement or "play" for module alignment purposes. Aligned in a vertical position along the back side of each slot is a rail connection bar in the tray. There are module inlet and outlet port connectors that also float and permit a slight amount of movement for module alignment purposes within each slot. Further, vertically disposed protuberances can be employed between any of the module inlet and outlet ports to provide horizontal (i.e., side to side) stabilization of the module when inserted into a respective tray slot. Two protuberances are used on the preferred embodiment, however less than or more than two can be employed as needed. All of the floating and locating parts discussed hereinabove work in coincidence to provide stabilization to the module when inserted in the tray and in particular assist in reducing loads at any given connection point or part so that no particular connector bears a greater amount of weight than is necessary or that would cause it to degrade more rapidly. For avoidance doubt, the unique stabilization system of the present invention spreads out the load of the module about all connectors and connection fittings. As an added benefit, this ensures no leakage at any of the ports that pass the liquid, oxygen and ozone in and out of the module and through the tray or other manifold that may be used herein.

In the preferred embodiment of the tray and module, respectively, a water-out connector and port are located at a top position, followed next by an oxygen-in connector and port positioned there below, followed next by a water-in connector and port located near the bottom and finally an ozone-out connector and port at the bottom end of each the tray slot and module, respectively. However, nothing herein requires that this exact placement of ports be used and other combinations or placements are contemplated and employed in alternate embodiments.

Each tray can contain any number of slots to form a rack of modules. However, in a preferred embodiment ten modules are aligned in a row on one tray to form one rack.

Within the upper housing, where all of the electronics are housed, is the power supply and transformer set-up wherein there is one transformer supplied for each individual ozone generating cell. Therefore, in a preferred embodiment, four transformers are provided, since four cells are employed in such embodiment. The power supply and transformer set-up in the preferred embodiment is identical to that which is seen in U.S. Pat. No. 7,746,001 to Francis, Jr. and is incorporated herein by reference. It is noted that the size of the module of the present invention requires a multiple transformer set-up within a confined space and therefore one wherein the transformers are in close proximity to one another. And for this reason the unique power supply with multiple leakage flux coupled transformers of the above mentioned Francis invention is employed.

High voltages are used in the modular ozone generation system of the present invention. However, such voltages are all contained within the module for safety purposes, and this is a vast improvement over all other prior art modular and compact ozone generators. Further, the present invention allows for instant on and linear control of ozone production from 1%-100% capabilities of the modular unit, regardless of the number of modular units employed in any rack or assembly formation. Still further an interface port, such as an RS-232 port, is provided in the upper housing for connecting to a PLC (programmable logic control).

Further, the modular ozone generator of the present invention operates at high frequencies outside the hearing of the human ear (i.e., 25 kHz). This is another vast improvement over the prior, which run at frequencies that are damaging to the human ear (within the range of the human ear, 20-20 k Hz) when in close proximity for long periods of time. Still further, the modular ozone generators of the present invention are all powered equally, one module by itself or in a rack, such that the same pulses are all fired at the same time to avoid a problem in the prior art known as cross-firing.

Other important aspects of the present invention that should be noted are that each modular unit by themselves, or in a rack, includes self pressure compensation and each modular unit has a fixed orifice to produce back pressure to balance all of the cells to the same output. Further, internal temperature protection shuts down power (power cut-back) to prevent overheating. This is designed into the ozone generating cell control software. Analog controls are provided for safety and on-off functions. Further, algorithms for auto control during start up and shutdown are employed. The system is designed to react to the liquid chemistry and is equipped with an in-house designed oxygen destruct system. Over-voltage protection is designed into the modular units and into any racks housing more than one unit.

As to the DC Bus for control, the pulse density modulation is designed specifically for the ozone power system of the present invention. The pulses are controlled to limit heat after strike, which translates into higher efficiency. Fault protection, automatic bus compensation, high voltage protection, under voltage protection and shut down, variable frequency control, pulse by pulse current limit control, consistent voltage regulation, master-slave configuration, auto-tune for changes in the operating or pressure conditions, input power loss ride through and a 4-20 milliamp control are all part of the present invention.

Finally, it should be noted that the modular ozone generator of the present invention or any rack or assembly formed by a plurality of modular units has increased economical advantages and efficiencies that allow the present invention to be labeled as "Green." These include the instant on-off that saves warm up time and operating costs, the solid state design that reduces power consumption, the power demand that is reduced because of the cooling system that saves a maximum amount of ozone by immediately cooling the ozone upon creation thereof, the power that is conserved by the use of minimal DC pulses for continuing an efficient ozone plasma, the liquid use that is low because it is optimized via computer analysis, the fact that the system maximizes the amount of ozone that gets out of the unit by immediately cooling the ozone, the further fact that the system has instant control for instant reaction to liquid chemistry, which saves on over production of ozone and subsequent destruction, that the system reacts to vary the power in relation to the requirement for ozone, that the system is designed to provide input to the oxygen separator so that it works in unison and reduces compressor loads and therefore subsequent power is reduced, that a minimal foot print reduces building costs as well as up-keep and maintenance costs and finally, but not limited to, that the software is designed to "soft start to last run settings" while instrumentation comes on line and levels out.

BRIEF DESCRIPTION OF THE DRAWINGS

The detailed description of the invention, contained herein below, may be better understood when accompanied by a brief description of the drawings, wherein:

FIG. 28 is a perspective view, bottom to top, of the same alternate embodiment of the present invention illustrating the air cooled system, but with one set of fans, the fan retaining frame and the two heat sinks removed so that the ozone generation cells can be seen.

DETAILED DESCRIPTION OF THE PREFERRED EMBODIMENT

Figure 1:
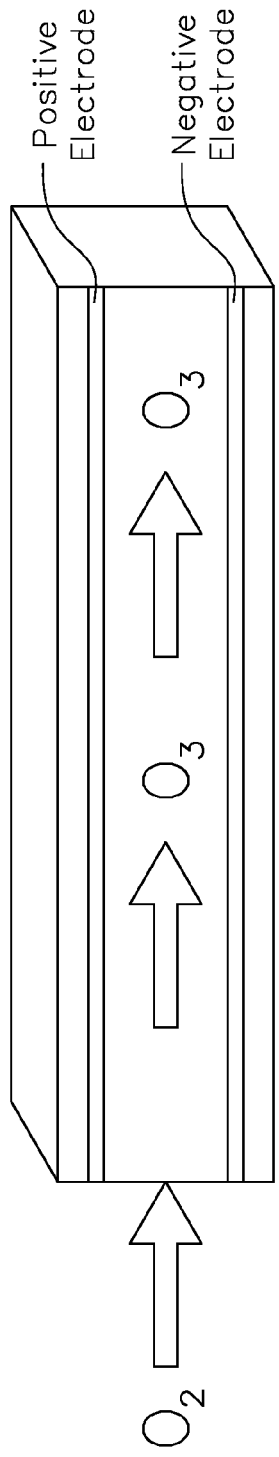
FIG. 1 is an illustration of a prior art ozone generator that shows how a single pathway of plasma is generated and are moved through the ozone generator between two electrodes.

Throughout the following detailed description, the same reference numerals refer to the same elements in all figures.

Figure 3:
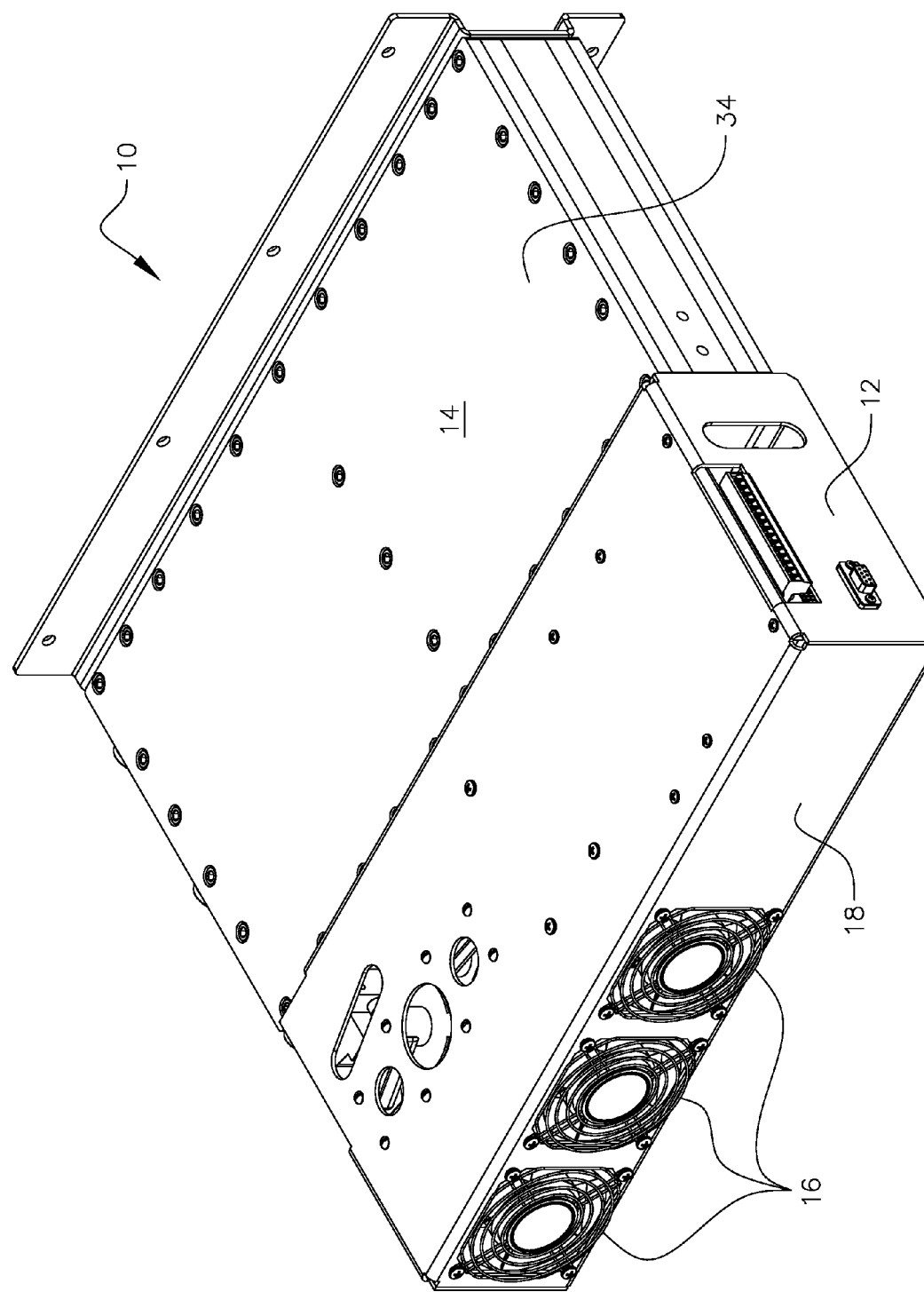
FIG. 3 is a perspective view of a modular quad cell, liquid cooled electro-mechanical ozone generator system of the present invention having an upper and lower housing and viewed from the top to bottom.
Figure 4:
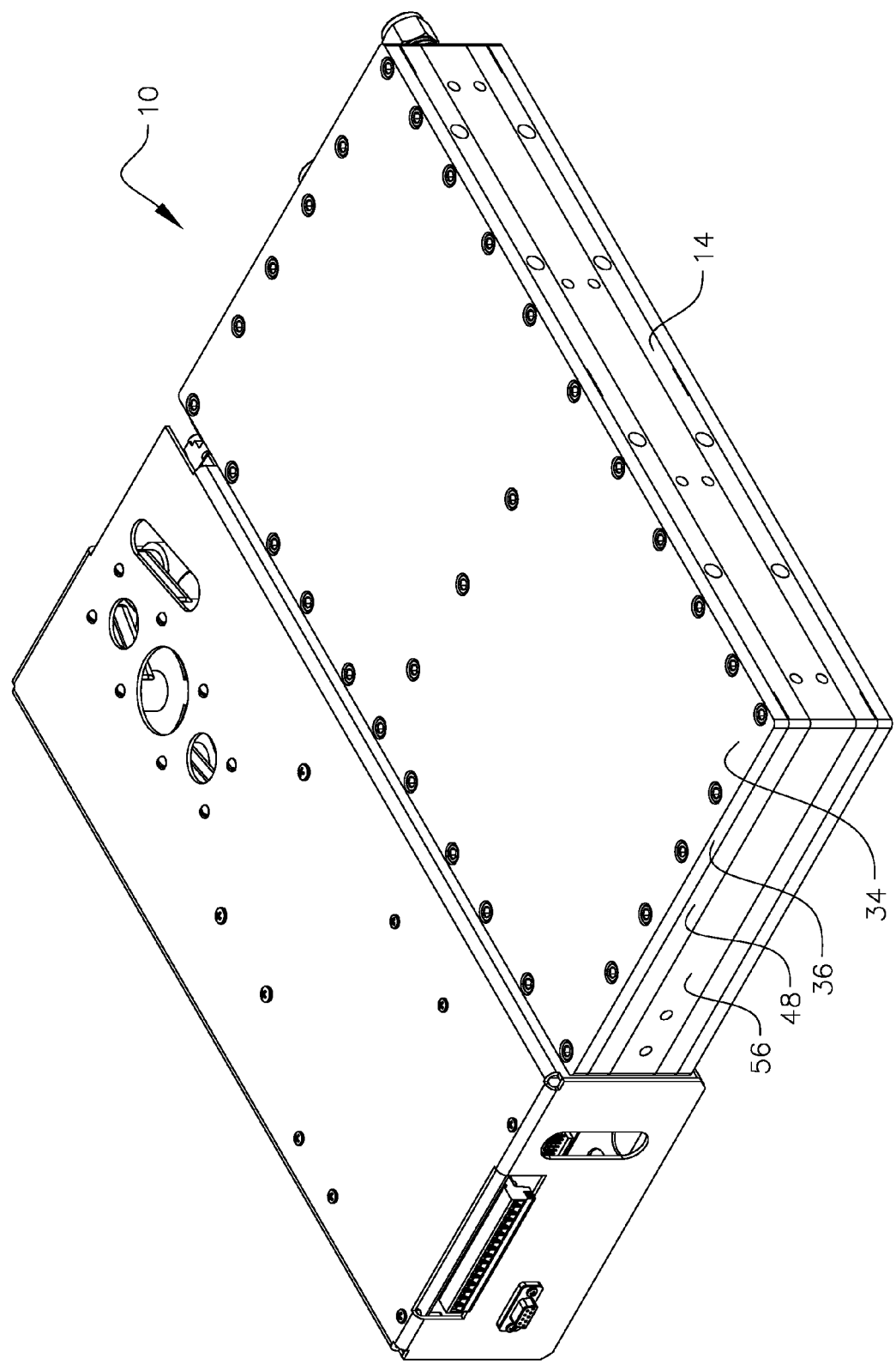
FIG. 4 is a perspective view the modular ozone generator system of the present invention, viewed from the bottom to the top.

Referring to FIG. 3, a modular quad block, liquid cooled, electro-mechanical ozone generating device 10 of the present invention is shown. Device 10 has an upper housing 12 and a lower housing 14, such that when standing upright in a vertical position (see FIG. 13), upper housing 12 has a slightly greater width than that of lower housing 14 and also a slightly greater length. Upper housing 12 encloses all of the electronic components needed to operate the ozone generating device 10 (see FIGS. 12 and 18-20), whereas lower housing 14 encloses all of the mechanical components of device 10 that include one or more ozone generating cells (see FIGS. 4-11 and 21). As further shown in FIG. 3 (and also in FIGS. 12 and 18), upper housing 12 includes a series of fans 16 positioned along a top end 18 of upper housing 12 (in the preferred embodiment there are three fans 16 employed along top end 18, although other nothing herein limits the use of just one or more than three fans 16). Fans 16 provide air cooling to a set of transformers 20 (see FIGS. 12 and 18) that are used in the powering scheme of device 10, which will be more fully discussed hereinafter.

Figure 12:
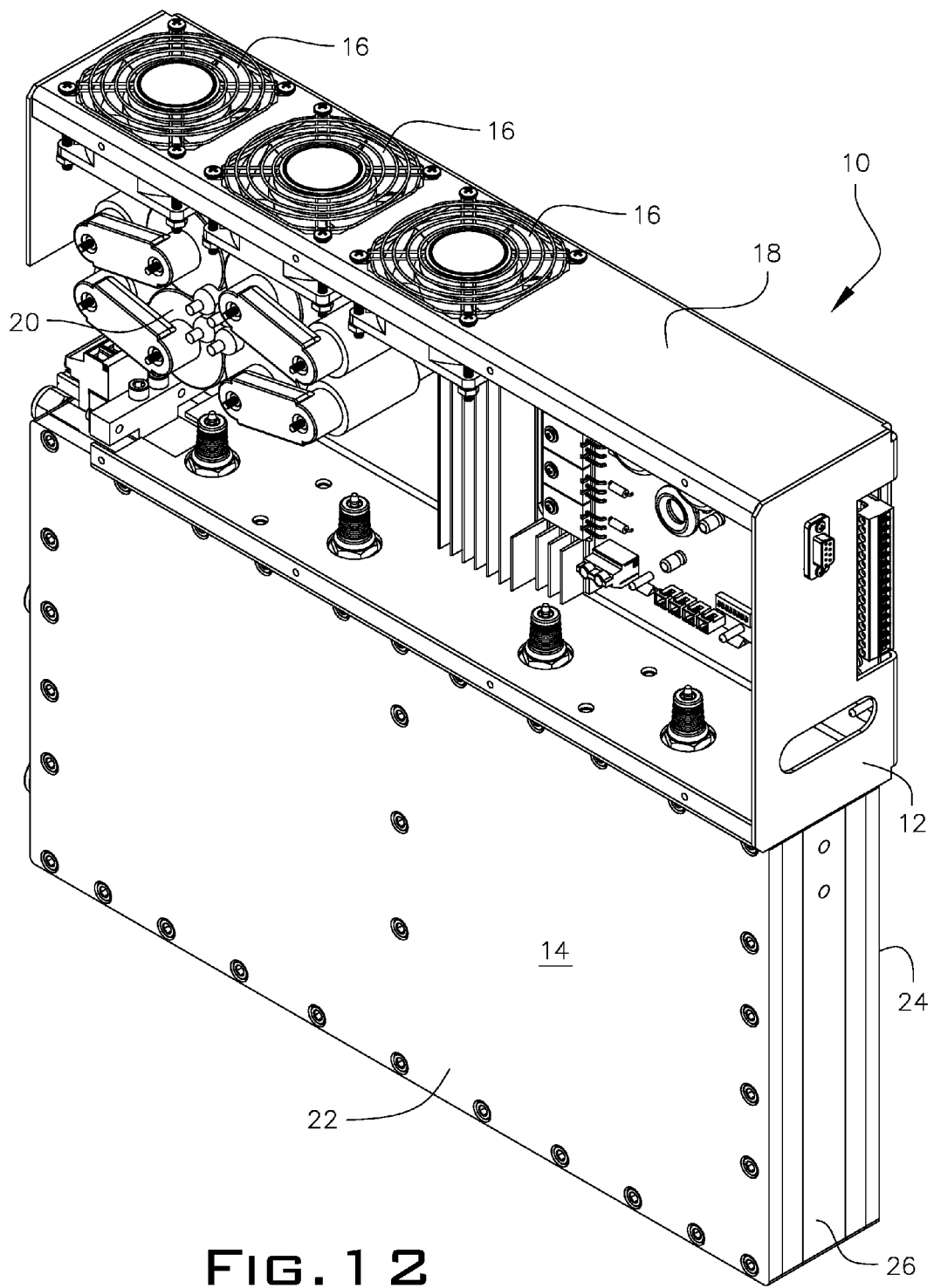
FIG. 12 is a perspective view of a modular ozone generator system of the present invention with a left side cover panel removed from the upper housing and positioned in its typical vertical position of use.
Figure 13:
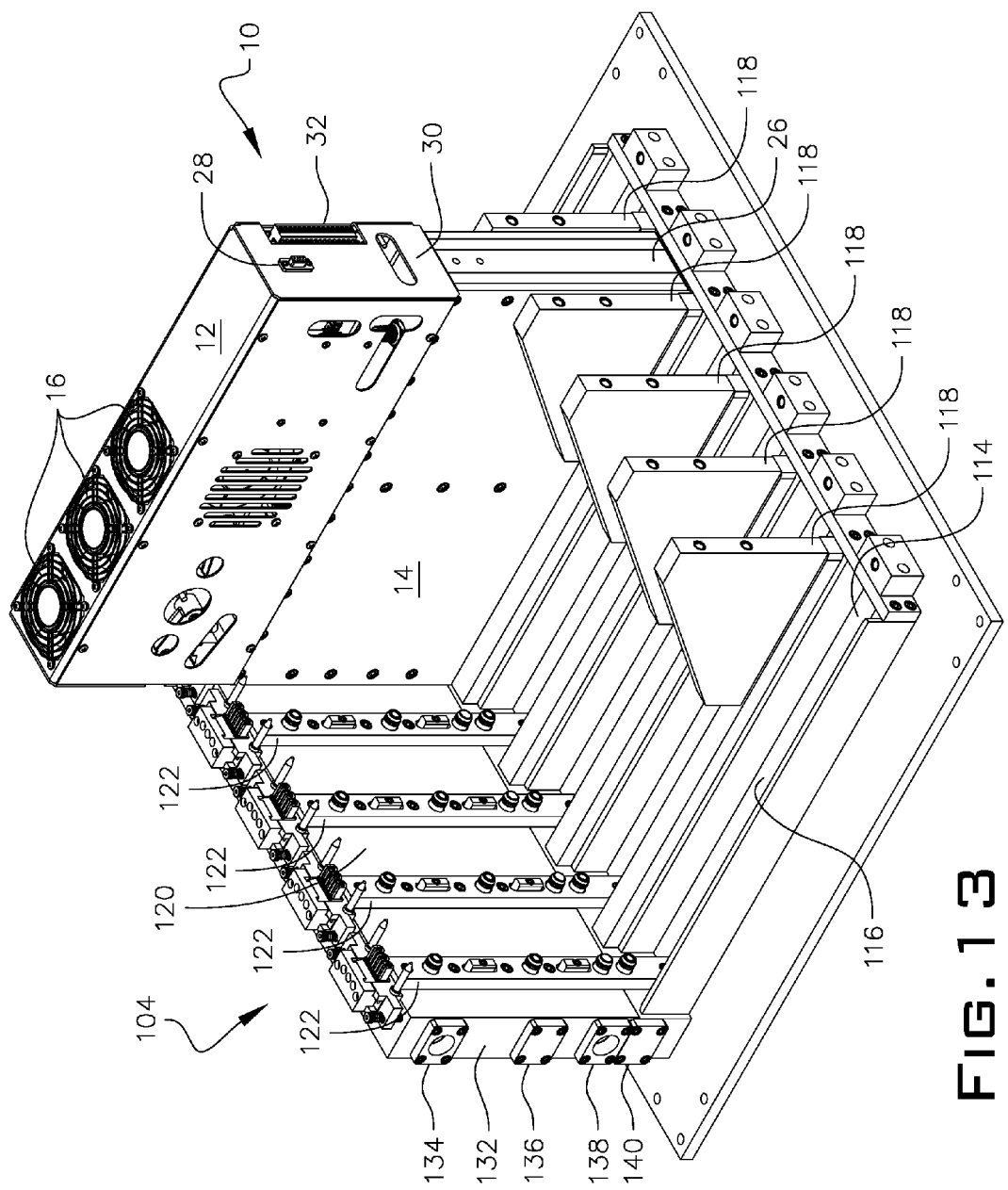
FIG. 13 a single modular ozone generator system of the present invention inserted into an example of a tray that can form a rack.
Figure 14:
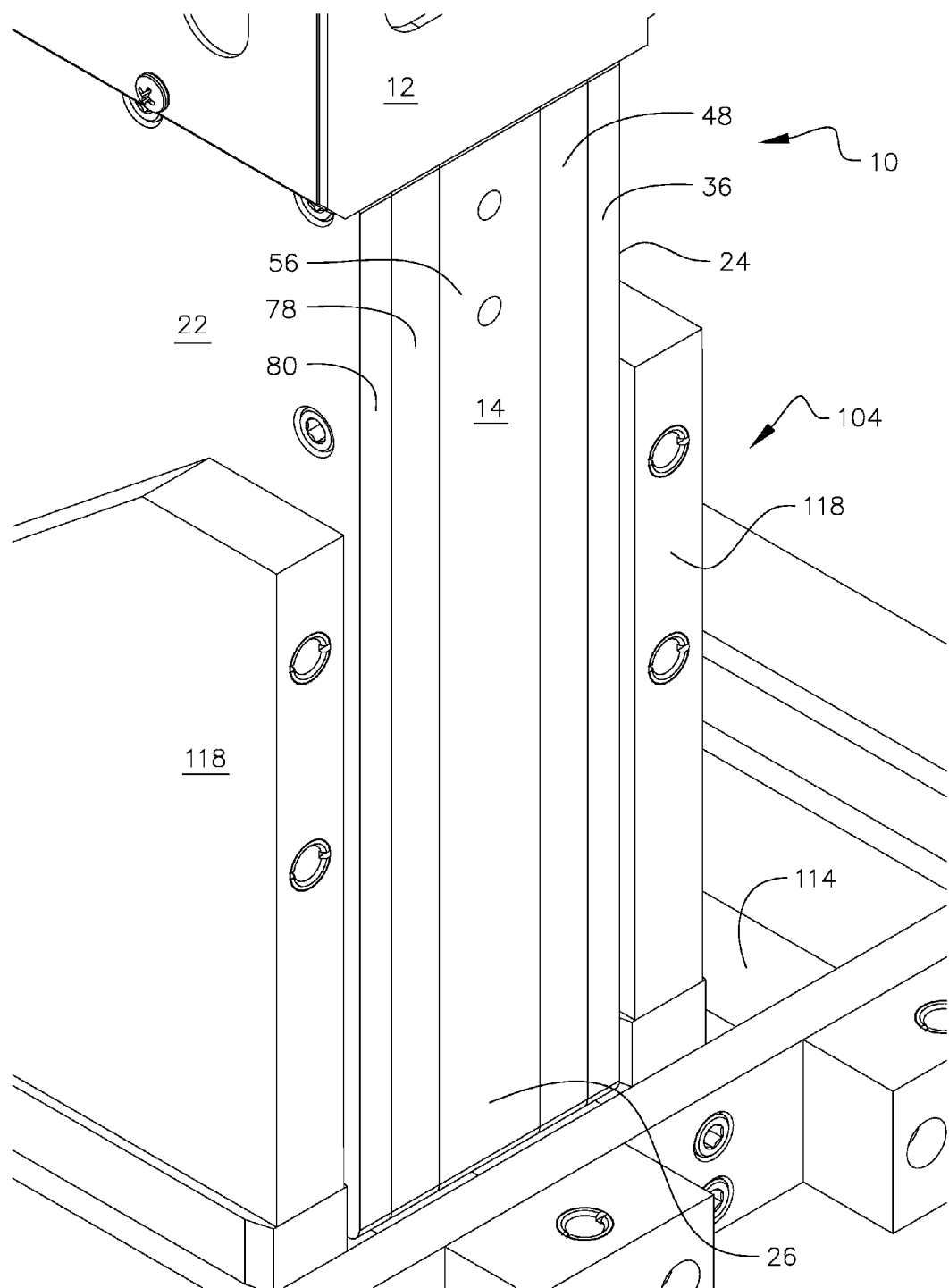
FIG. 14 is a close-up view of a single modular ozone generator system of the present invention inserted into a slot of the tray illustrating the five sections that make up the lower housing.

Referring to FIGS. 12-14, device 10 is shown in its normal upright or vertically disposed position. Accordingly, device 10 has a left side 22, a right side 24 and a bottom end 26. What is particularly meant by its "normal upright or vertically disposed position" is the position or orientation that the device 10 is most typically used when employed. However, nothing herein limits that device 10 be used in any other orientated positions of which are shown through out many of the other figures herein for the purposes of illustrating and describing each and every part of device 10. However, as seen in FIGS. 12-14, this vertical orientation is used in the preferred embodiment.

Referring now to FIG. 13, it is shown that device 10 has a serial interface connector 28 (such as a DB9 connecter) on a front face 30 of upper housing 12 used to connect device 10 to a PLC (programmable logic control). Further, device 10 also has a standard analog interface connector 32 (such as a RS232 or other interface) on upper housing front face 30 for use in providing a computer interface protocol to the device processor.

Figure 11:
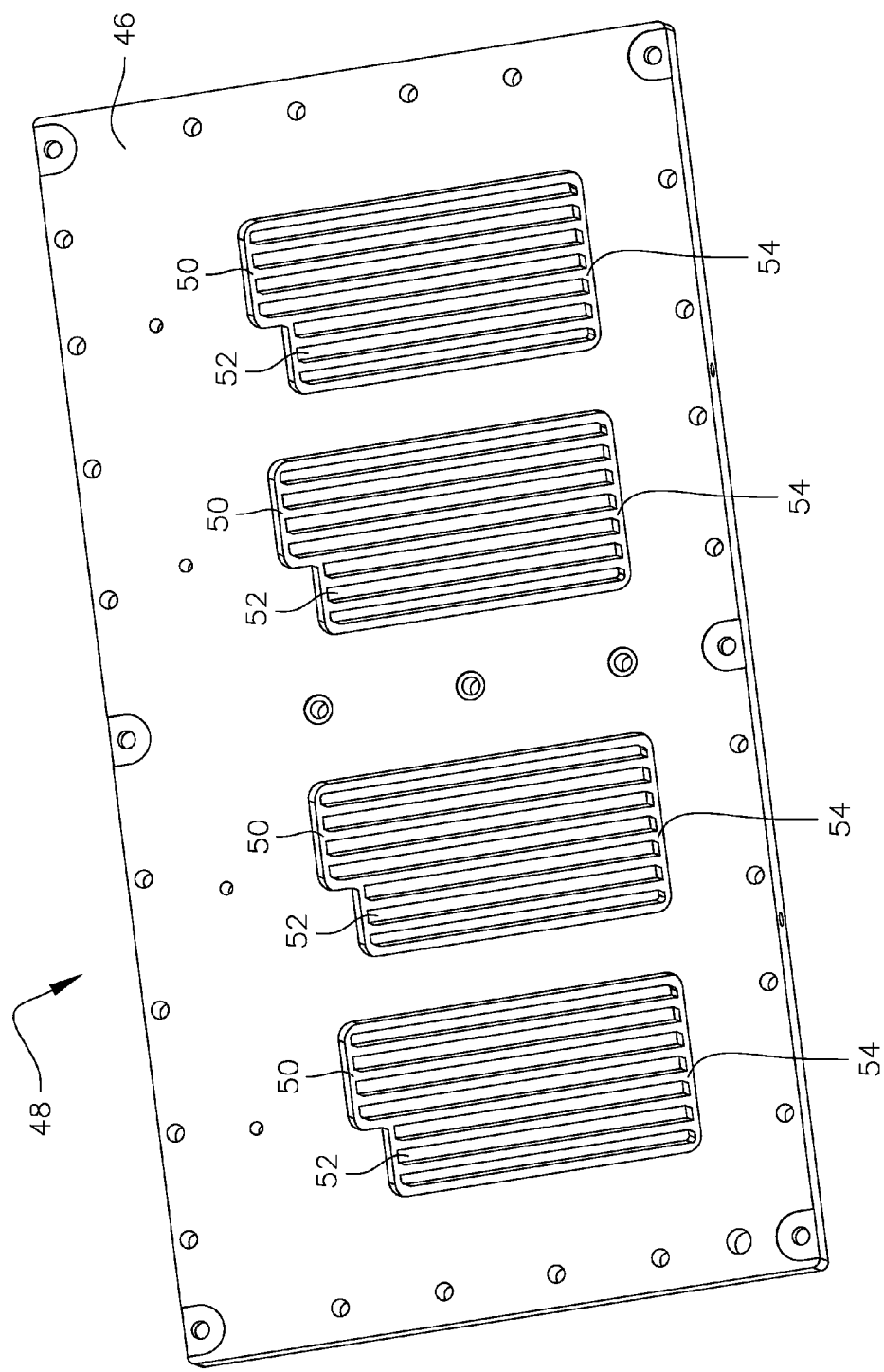
FIG. 11 is a perspective view of a top side of the plasma generating micro-channel network section layer illustrating a liquid coolant layer section used therein.

Referring now to FIGS. 4-11 and FIG. 21, the internal mechanical parts that make up the ozone generating cells are shown in varying views and different perspectives and will now be discussed in full detail. First, referring to FIG. 4, device lower housing 14 includes a top cover 34 (see FIG. 3), which can be made from aluminum, for example, a first section layer 36 (detail shown in FIG. 10) which on a bottom side 38 (see FIG. 10) includes four separate liquid inlet channels 40, four indented liquid circulation areas 42 to cool the ozone of four separate generation cells of device 10 and a hot liquid outlet manifold 44, which is in fluid communication with a liquid outlet port of device 10 to be discussed hereinafter. A top side of first section layer 36 (not shown) is machined flat. A second section layer 48 has a top side 46, as seen in FIG. 11, which has four separate milled indents 50 supporting a series of parallel disposed fins 52, which define a continuous fluid channel 54. First section layer bottom side 38 mates with second section layer top side 46 to create a series of sealed internal liquid coolant systems, one each for each ozone generation cell of device 10, wherein all of the ozone produced is internally cooled within device 10 before being porting there out.

Figure 9:
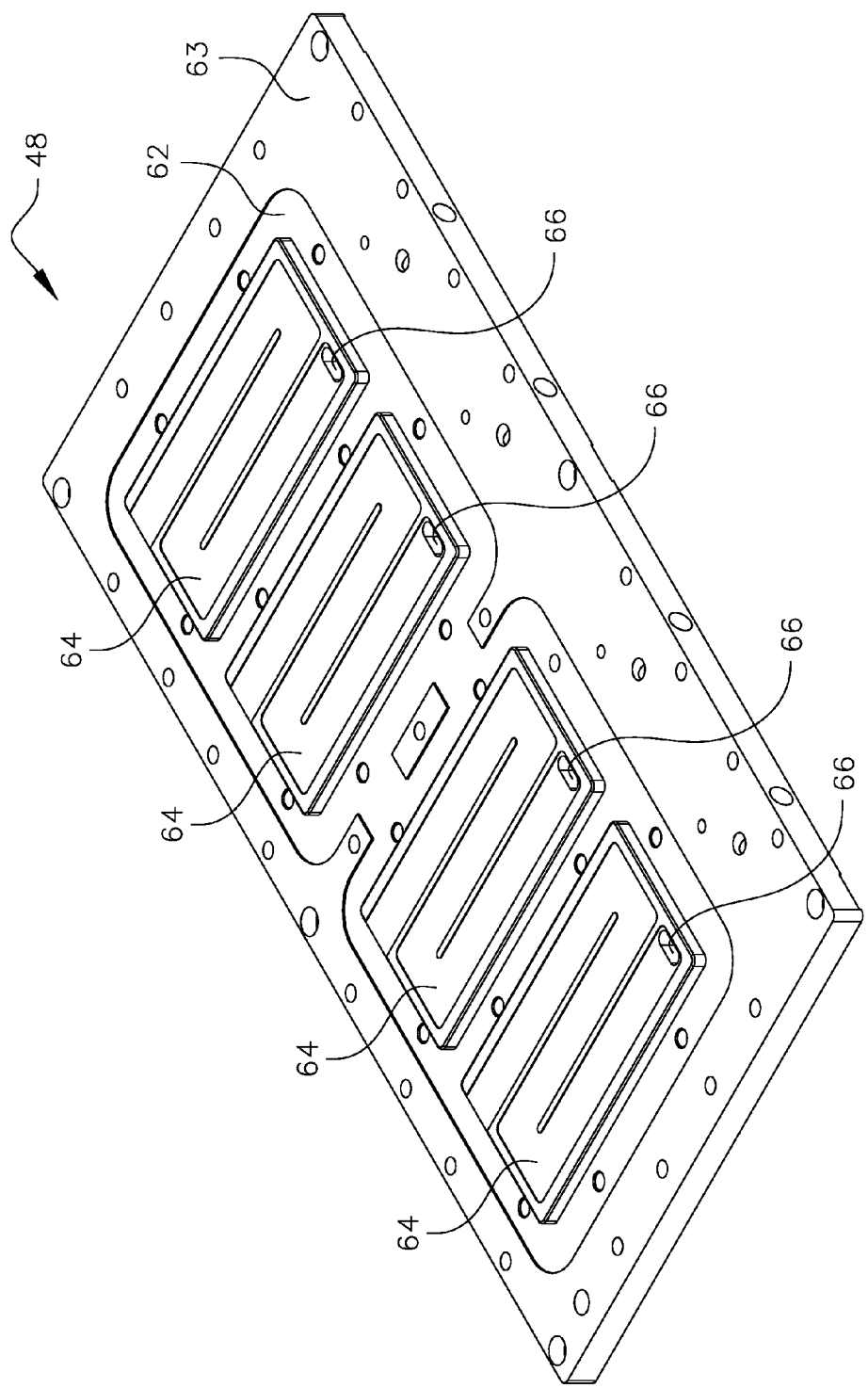
FIG. 9 is a perspective view of a bottom side of plasma generating micro-channel network section layer employed in the modular ozone generator system lower housing.
Figure 10:
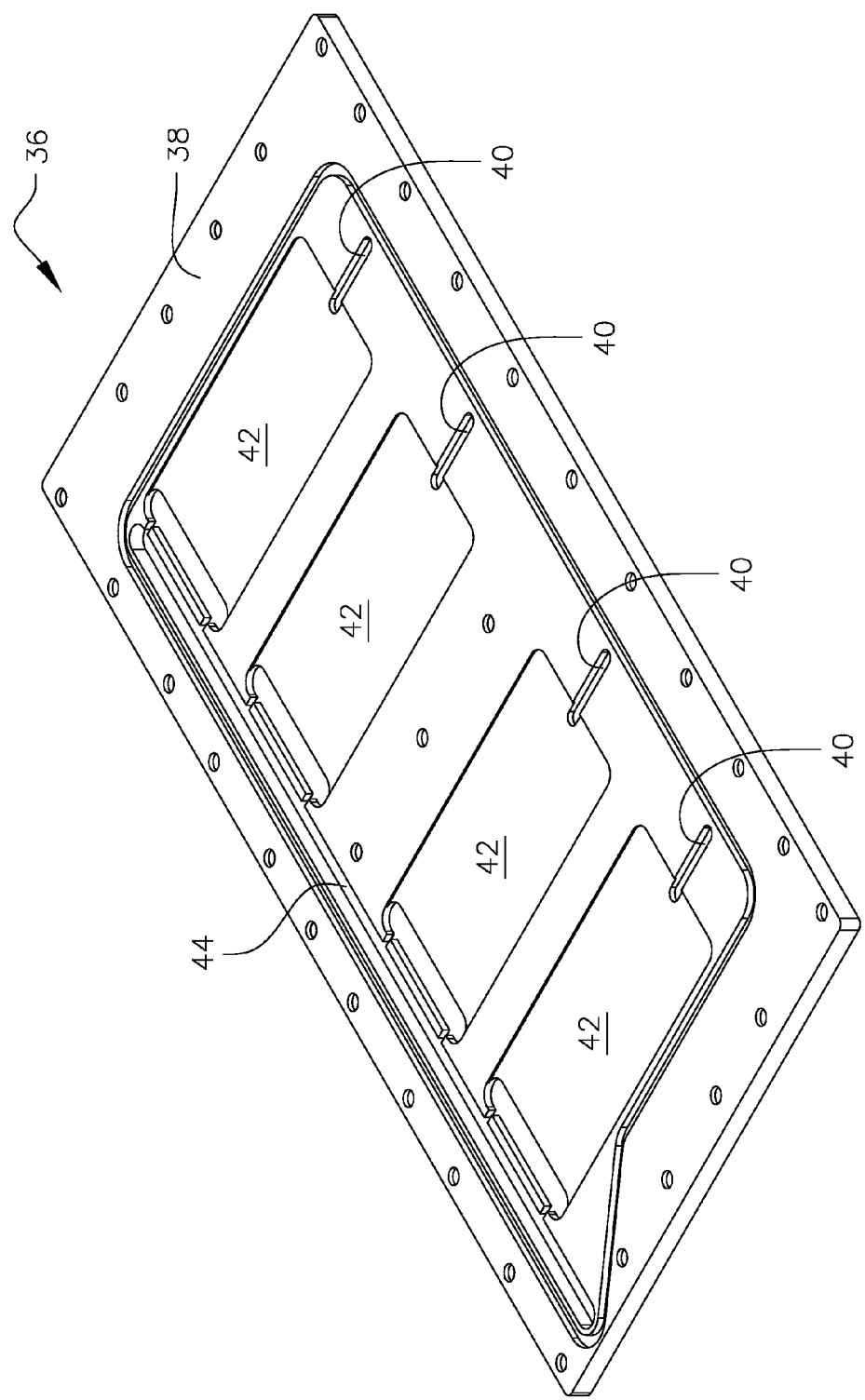
FIG. 10 is a perspective view of a top portion of a liquid coolant layer section used in the modular ozone generator system lower housing.

Referring now to FIG. 9, second section layer 48 also has a bottom side 63, which has two divided quadrants and has an ozone micro-channel network plate 62 inserted there within. Plate 62 has four separate ozone micro-channel networks 64 (one each for each ozone generating cell), wherein the plasma reaction occurs that results in the ozone production, of which will be more fully described hereinafter. On each of the ozone micro-channel networks 64, there is an orifice 66 for creating a fixed pressure drop within the respective ozone generating cell and for porting the ozone that is created in each sub-cell of each ozone generation cell to an ozone-out port. Second section layer 48 is positioned juxtaposed to first section layer 36 such that the liquid coolant system keeps the ozone relatively cool during the plasma generation process. This unique internal cooling process is a vast improvement over the prior art and eliminates the need for internal piping or external cooling devices and of which to date and has never been seen before in the prior art. In the preferred embodiment, water is used as the liquid coolant. However, nothing herein limits the use of other like property liquids.

Figure 8:
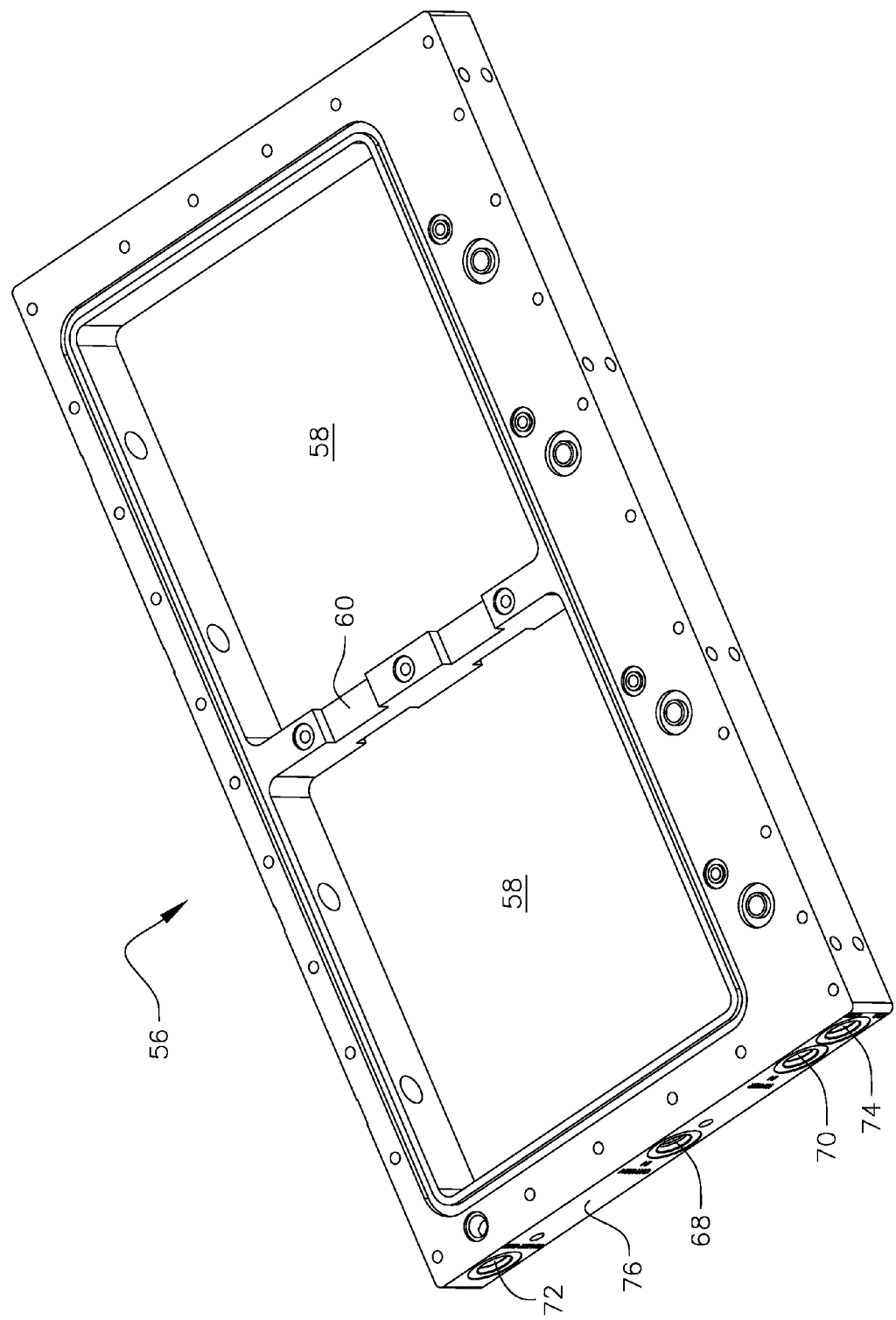
FIG. 8 is a perspective view of the center body framing element employed in the modular ozone generator system lower housing.
Figure 21:
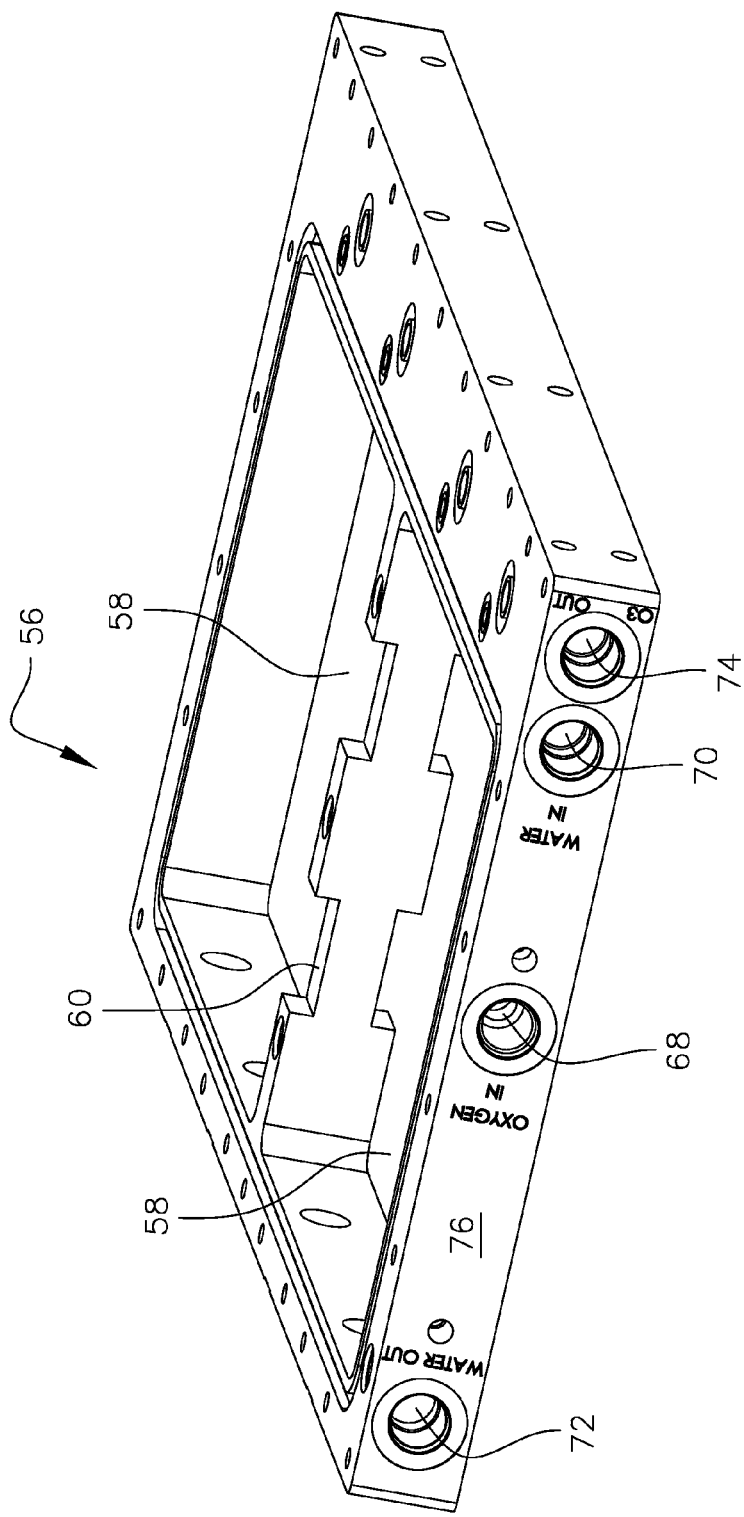
FIG. 21 is a rear perspective view of the center body framing element employed in the lower housing of the modular ozone generator of the present invention illustrating the location of the water-in and out, oxygen-in and ozone out ports.

As seen in FIGS. 8 and 21, a center body framing element 56, positioned within lower housing of device 10 (see FIGS. 4-6), has an oxygen-in port 68, a water-in port 70, a water-out port 72 and an ozone-out port 74. These four ports are formed along a left side wall 76 of center body framing element 56, of which is at a rear portion of device 10 of the present invention when it is vertically disposed and in use (see FIGS. 13 and 17). Center body framing element 56, generally formed as a rectangular body, is further divided into two quadrants 58 (see FIG. 8), which are separated by a dividing bar 60. Quadrants 58 are largely hollowed-out but house the forced distribution and equalization system (to be discussed in further detail hereinafter), wherein most of the oxygen accumulates during the ozone generation production process.

Figure 2:
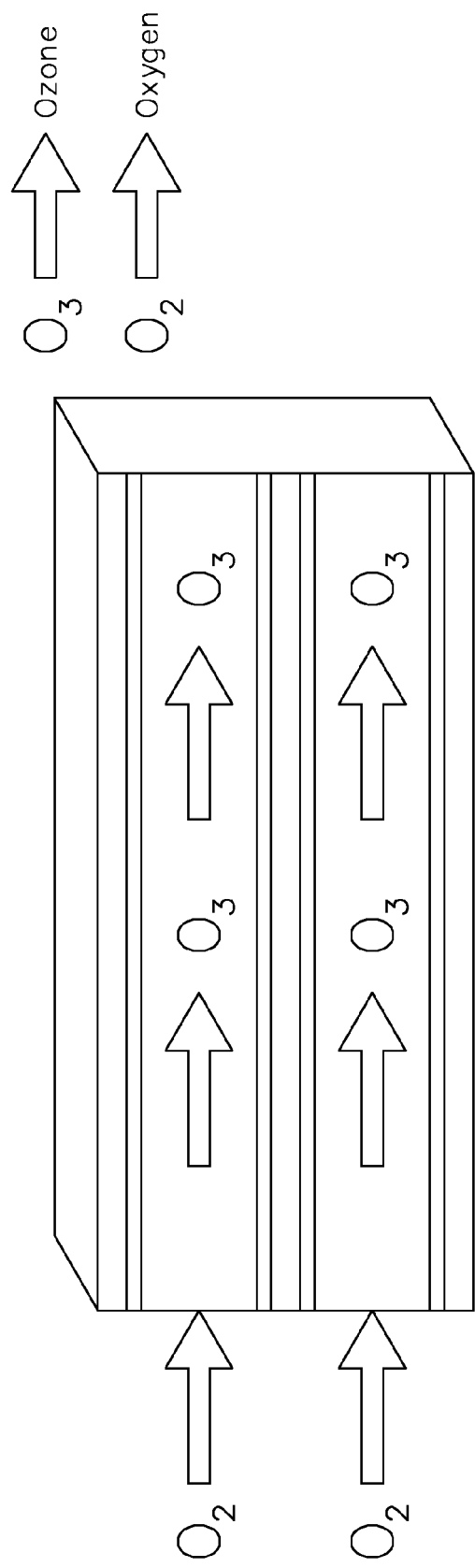
FIG. 2 is an illustration of an ozone generator cell employed in the present invention that shows how two pathways of plasma are generated and are moved through the ozone generator cell between separated pairs of electrodes.
Figure 5:
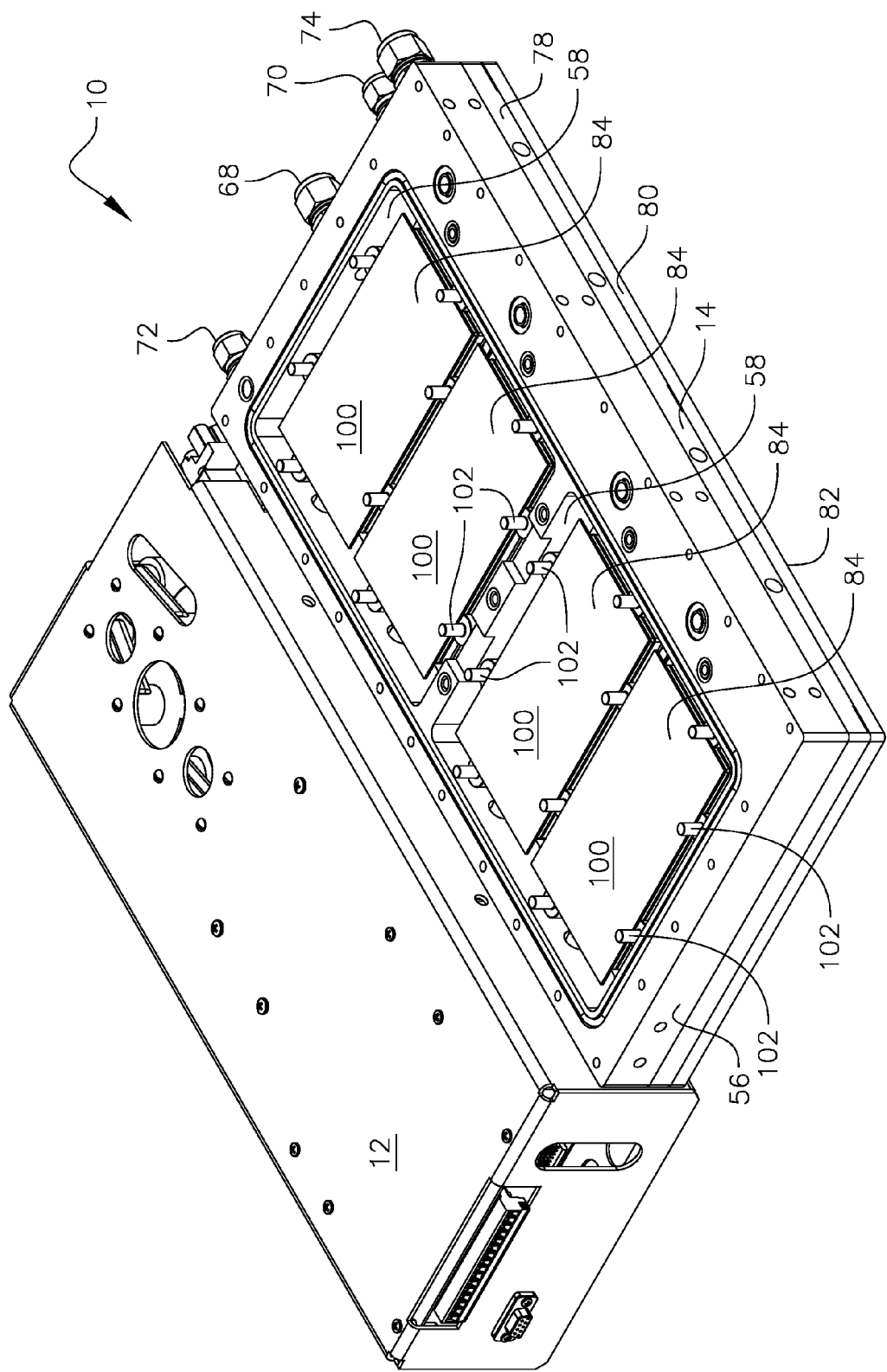
FIG. 5 is a perspective view of the modular ozone generator system of the present invention with a top cover of the lower housing removed along with other internal parts that are positioned proximal to the top cover, such that top ceramic plates of each ozone generation cell within the present invention can be seen.

Referring now to FIG. 5, device 10 is shown having top cover 34 (see FIG. 3), and first and second section layers 36 and 48 (see FIG. 4), respectively, removed and third section layer, center body framing element 56, clearly shown. This figure illustrates that device 10 employs, in the preferred embodiment, four ozone generating cells, two each in the two quadrants 58 formed in center body framing element 56 by dividing bar 60. It is important to remember that in the preferred embodiment each ozone generating cell is really made up of two "sub-cells" in that two plasma generating pathways are employed for each cell as previously shown and described in FIG. 2.

Figure 6:
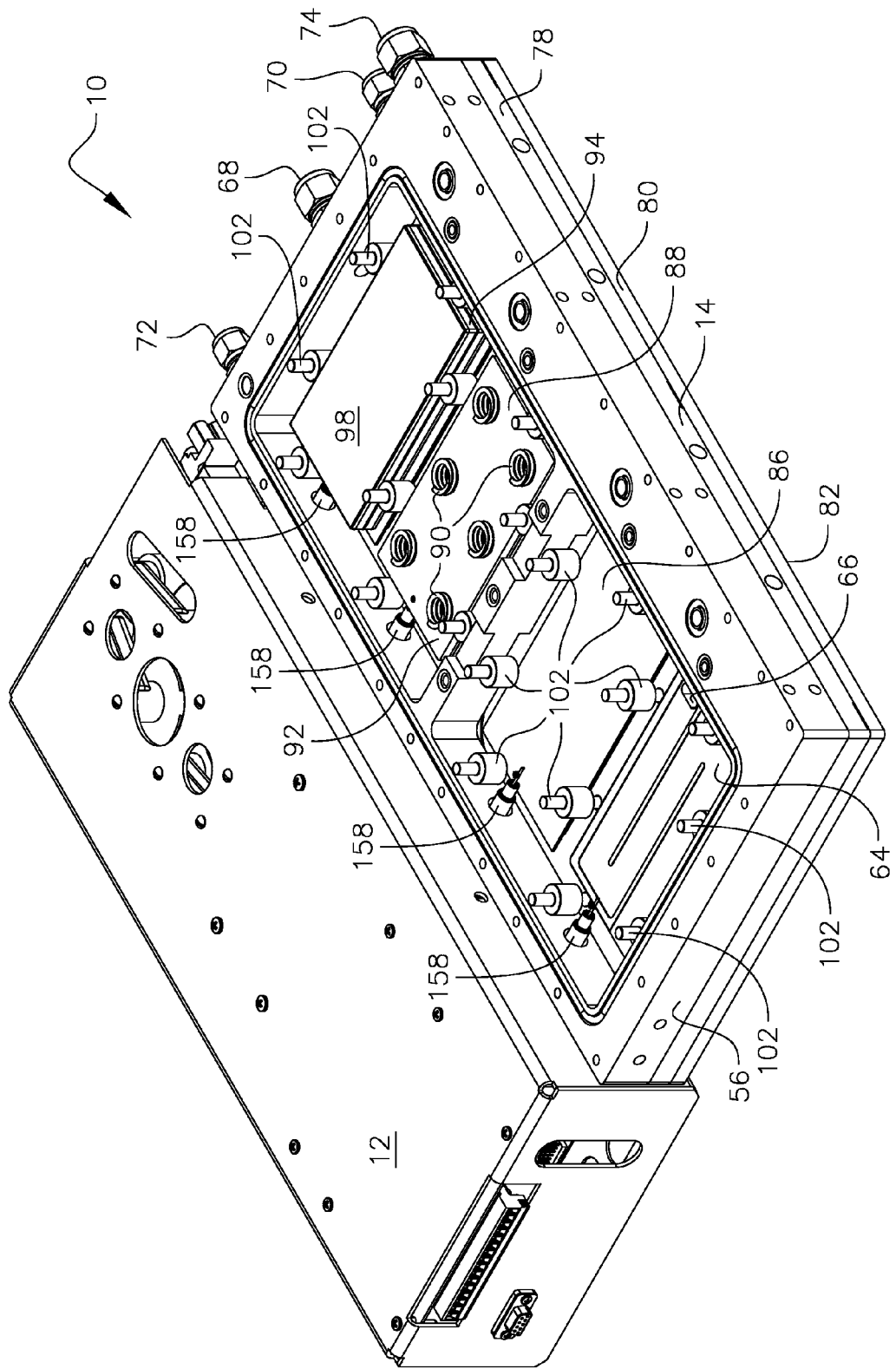
FIG. 6 is a similar perspective view of the modular ozone generator system of the present invention like that shown in FIG. 5 with the top cover of the lower housing removed along with other internal parts including some of those that are positioned in a center body framing element, such that different layers of the generating cells can be seen.
Figure 7:
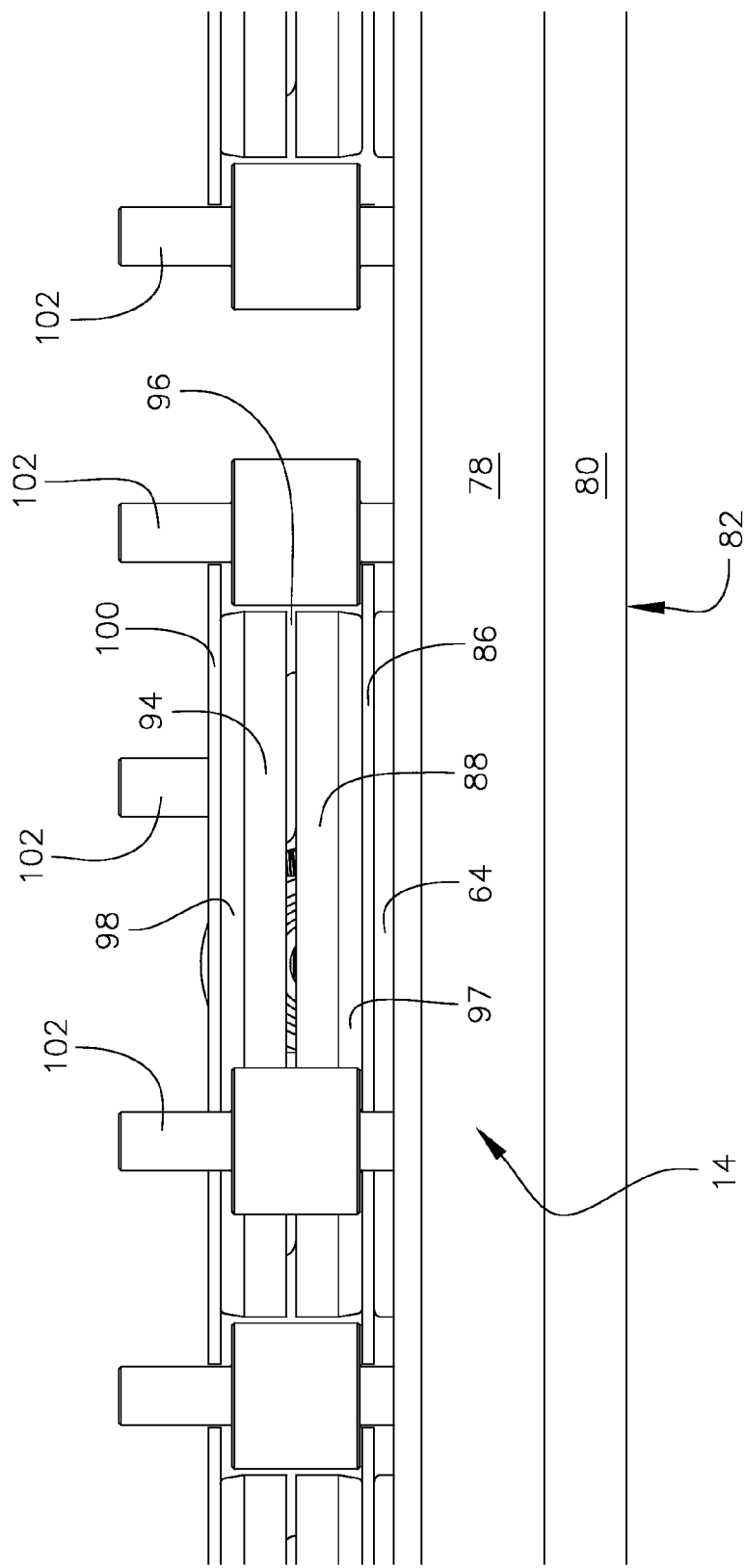
FIG. 7 is a side plan view of the modular ozone generator system lower housing, with the top cover and other top layer sections removed to show the internal parts that make up the forced distribution and equalization system located in the center body framing element in an ozone generating cell within the present invention.

With reference to FIGS. 5-7, it is shown that device 10 employs four forced distribution and equalization systems 84 (see FIG. 5) that generally locate within the center body framing element two quadrants 58. With specific reference to FIGS. 6 and 7, the various structural components that make up the pressure equalization systems 84 of the present invention are shown therein. In particular, for each pressure equalization system 84, there is a first (bottom) ceramic plate 86 positioned on top of the "bottom" ozone micro-channel network 64 (see FIG. 7). Then a bottom plate 97 made of stainless steel is placed on top of first ceramic plate 86. Thereafter, a first stainless steel plate 88 having a plurality of springs 90 (see FIG. 6) located about a top surface 92 of plate 88 is placed on top of first (bottom) ceramic plate 86. Thereafter, a second stainless steel plate 94 is positioned on top of the plurality of springs 90 so that a small gap 96 is formed (see FIG. 7) for allowing a specific amount of force (psi) for uniform force or pressure distribution.

Thereafter, a top plate 98 made of stainless steel is positioned on top of second stainless steel plate 94 for providing the same purpose—they push against each other and create the uniform distribution of force and adjust for any inconsistencies that would normally occur.

Figure 17:
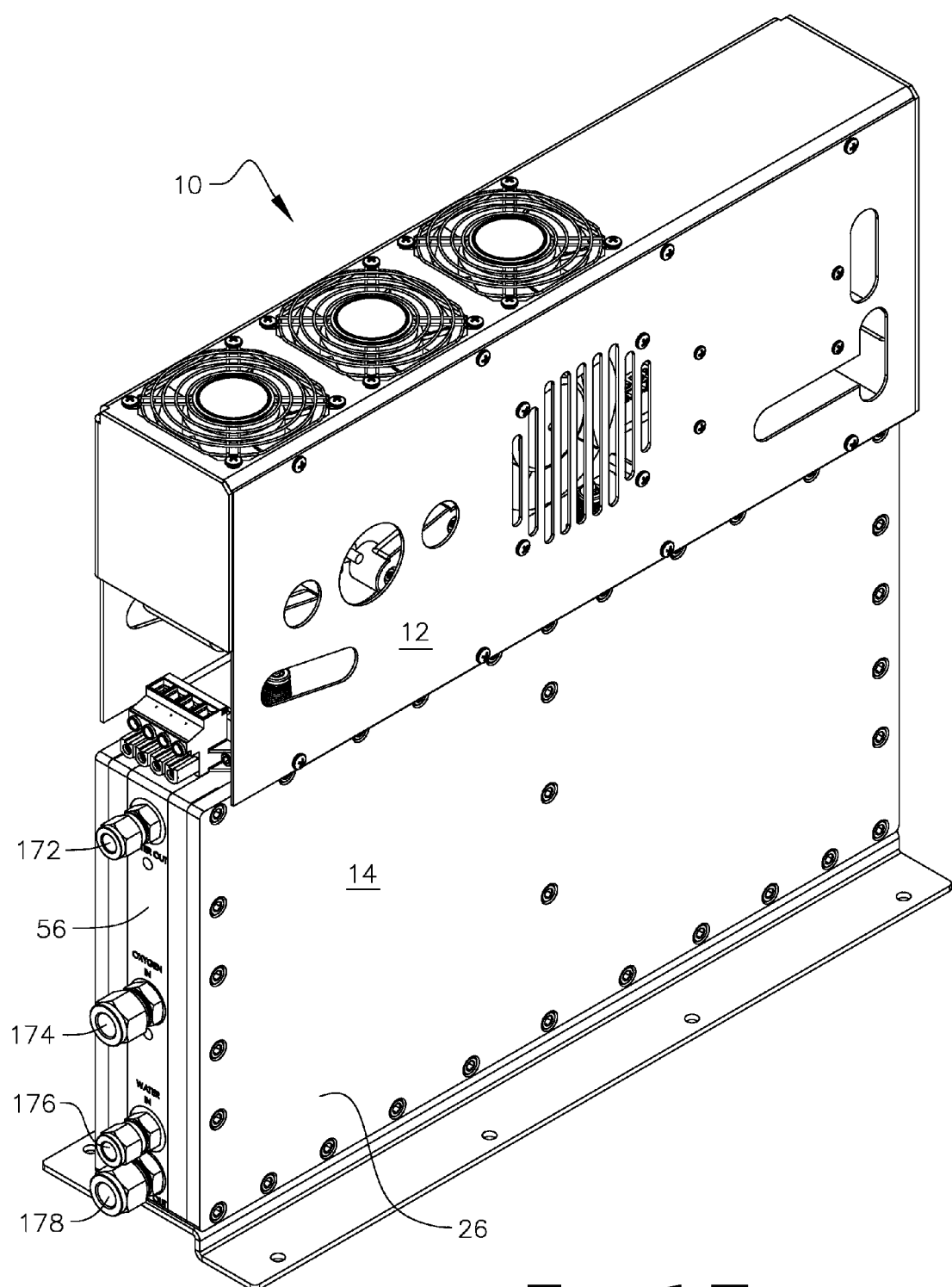
FIG. 17 is a rear perspective view illustrating the coupling points of the modular ozone generator system of the present invention.

Finally, a second (top) ceramic plate 100 (see FIGS. 5 and 7) is positioned on top of top plate 98. It should be noted again that when device 10 is orientated it is vertical position of standard use (as shown in FIGS. 12, 13 and 17), then top to bottom can clearly be understood to mean left to right.

With continuing reference to FIGS. 5-7, it is shown that a plurality of locators 102 are employed throughout lower housing 14, which are used to secure and/or "locate" pressure equalization systems 84. In the preferred embodiment, locators 102 are made from polytetrafluoroethylene (PTFE), also commonly known as Teflon™. However, any fluoropolymer or other like material having characteristics that have excellent thermal and electrical insulation properties and a low coefficient of friction can be employed herein. And therefore, nothing limits the use of only Teflon™ for locators 102.

Although not shown directly in FIGS. 5-7 because various components such as the pressure equalization system 84 and at least ozone micro-channel network 64 in FIG. 6 are covering them, as well fourth and fifth section layers, 78 and 80 respectively in FIG. 7, but another ozone generating "sub-cell" and another liquid coolant system are employed (as previously described and shown in FIGS. 9-11) on a bottom side of each pressure equalization system 84 within center body framing element 56. However, with reference to FIG. 7, bottom (or left) ozone micro-channel network 64 can be seen directly under first (bottom or left) ceramic plate 86. Then with reference to FIGS. 5 and 6, a fourth section layer 78 is shown which is analogous to the second section layer 48 shown in FIG. 9. Thereafter, a fifth section layer 80 is provided, which is analogous to first section layer 36 shown in FIG. 10 except that the water inlets 40, water circulation areas 42 and the water outlet manifold 44 are all disposed on a bottom side (not shown). Further, as to fourth section layer 78, all of the indents 50, fins 52 and the continuous channel 54 formed around fins 52 are disposed on a bottom side (also not shown) thereof to create the same novel internal liquid coolant system of that previously described above and used in lower housing 14 of device 10 of the present invention. Finally, a bottom cover 82 is placed there over to completely enclose lower housing 14 (see FIG. 5-7), save the four ports previously described for water-in and out, 70 and 72, oxygen-in 68 and ozone-out 74 all formed in center body framing element 56. It should be noted that lower housing 14 has been described to have a top and bottom side cover, 34 and 82, respectively. However, it is understood that when device 10 is orientated for use in a vertical position that bottom cover 82 is on the left side of device 10 while top cover 34 is on the right side thereof. Further, the same can be said about the various section layers of lower housing 14 in that the fifth and fourth sections layers, 80 and 78 are on the left side and the first and second section layers, 36 and 46, are on the right side of device 10 when orientated in a vertical position or used in relation to center body framing element 56. It should also be noted that a great amount of machining has been done on all of the flat surfaces of the section layers as previously described, in order to reduce the number of parts and make the lower housing work more efficiently, which is a vast improvement over the prior art. It is further noted that such novel approach has never been seen before in the prior art, especially as it applies to the great amount of internal manifolding that is present within lower housing 14.

Figure 22:
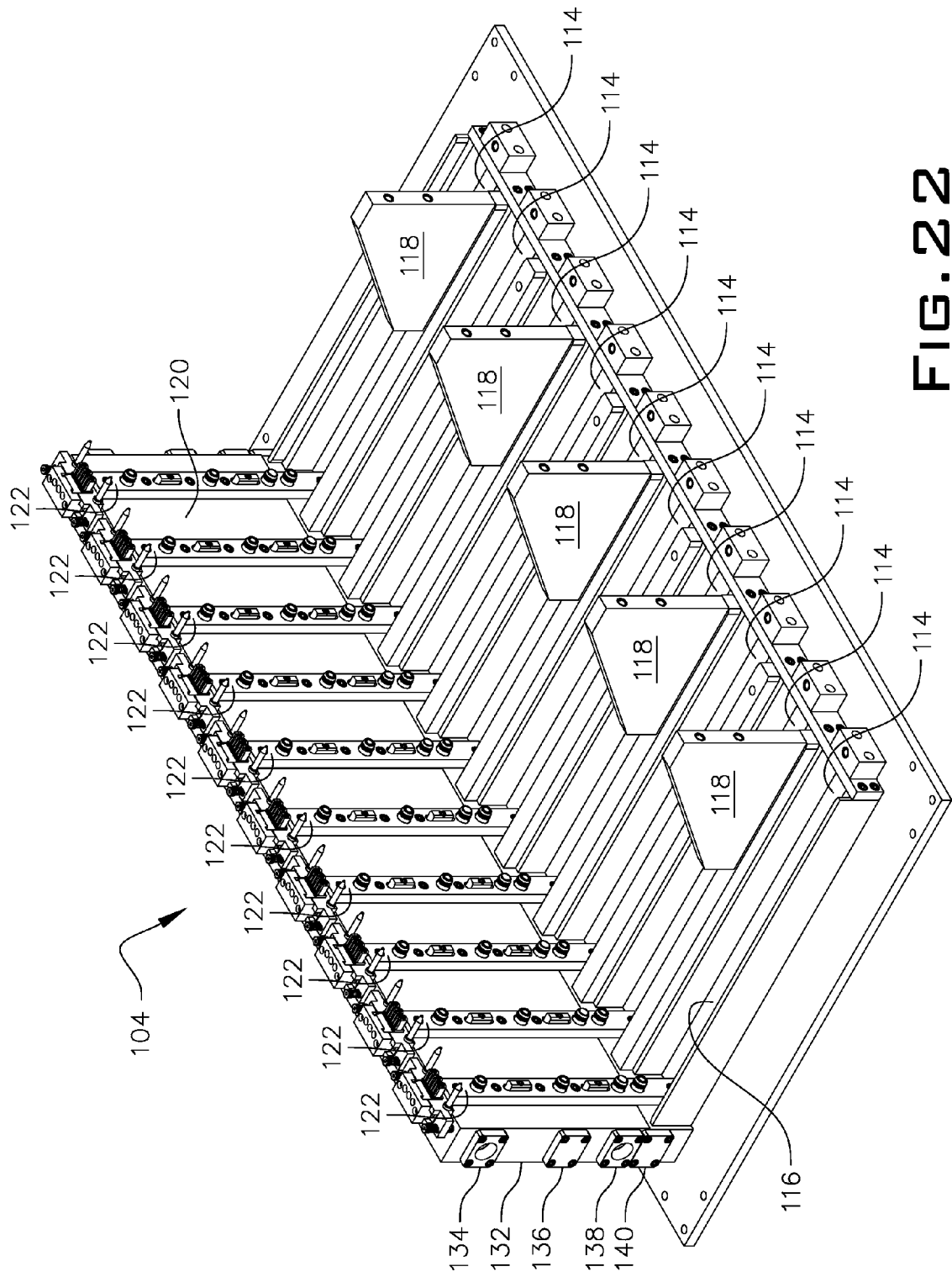
FIG. 22 is a perspective view of the rack used in the present invention to receive and support one or more modular ozone generating cells of the present invention.
Figure 23:
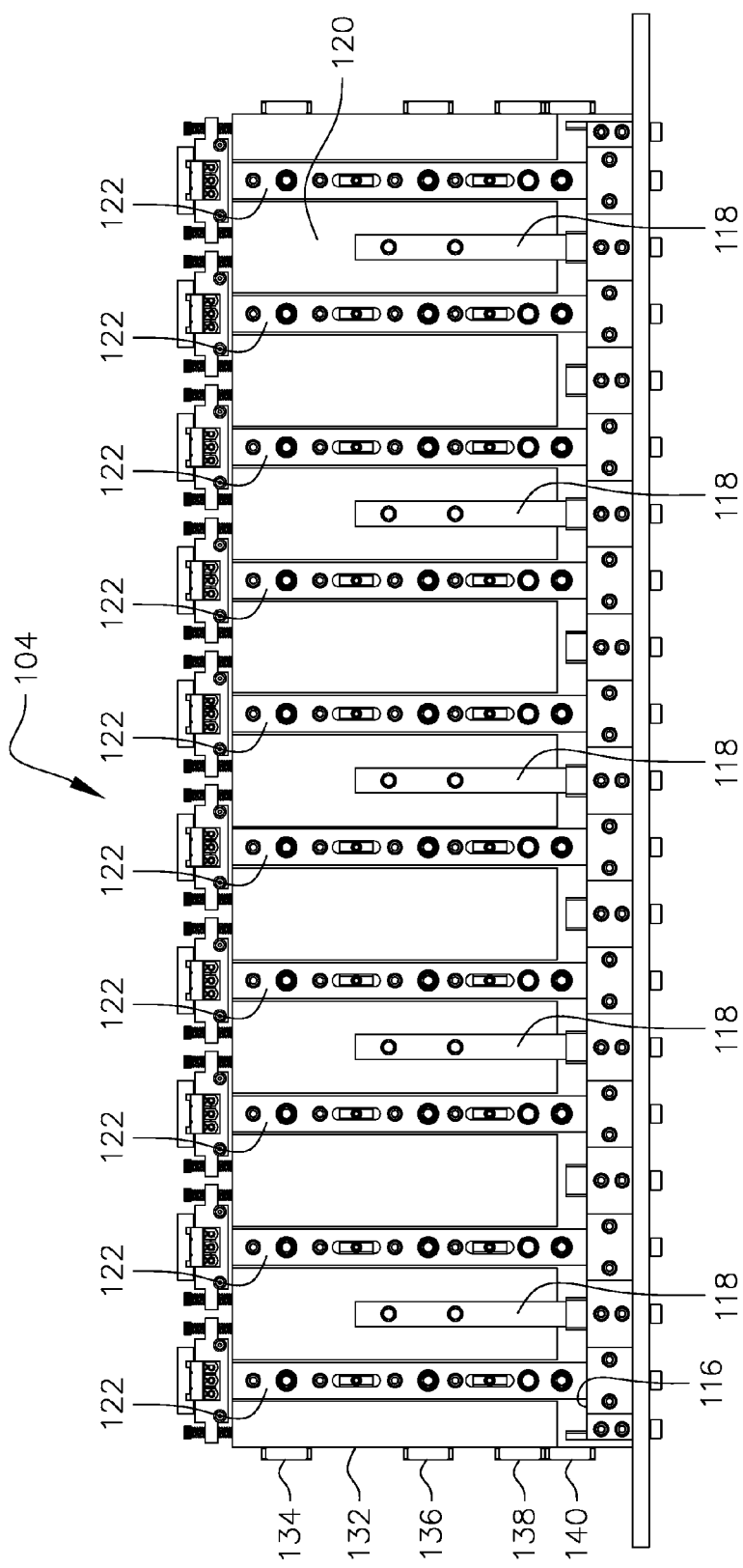
FIG. 23 is a front elevational view of the rack shown in FIG. 22.
Figure 24:
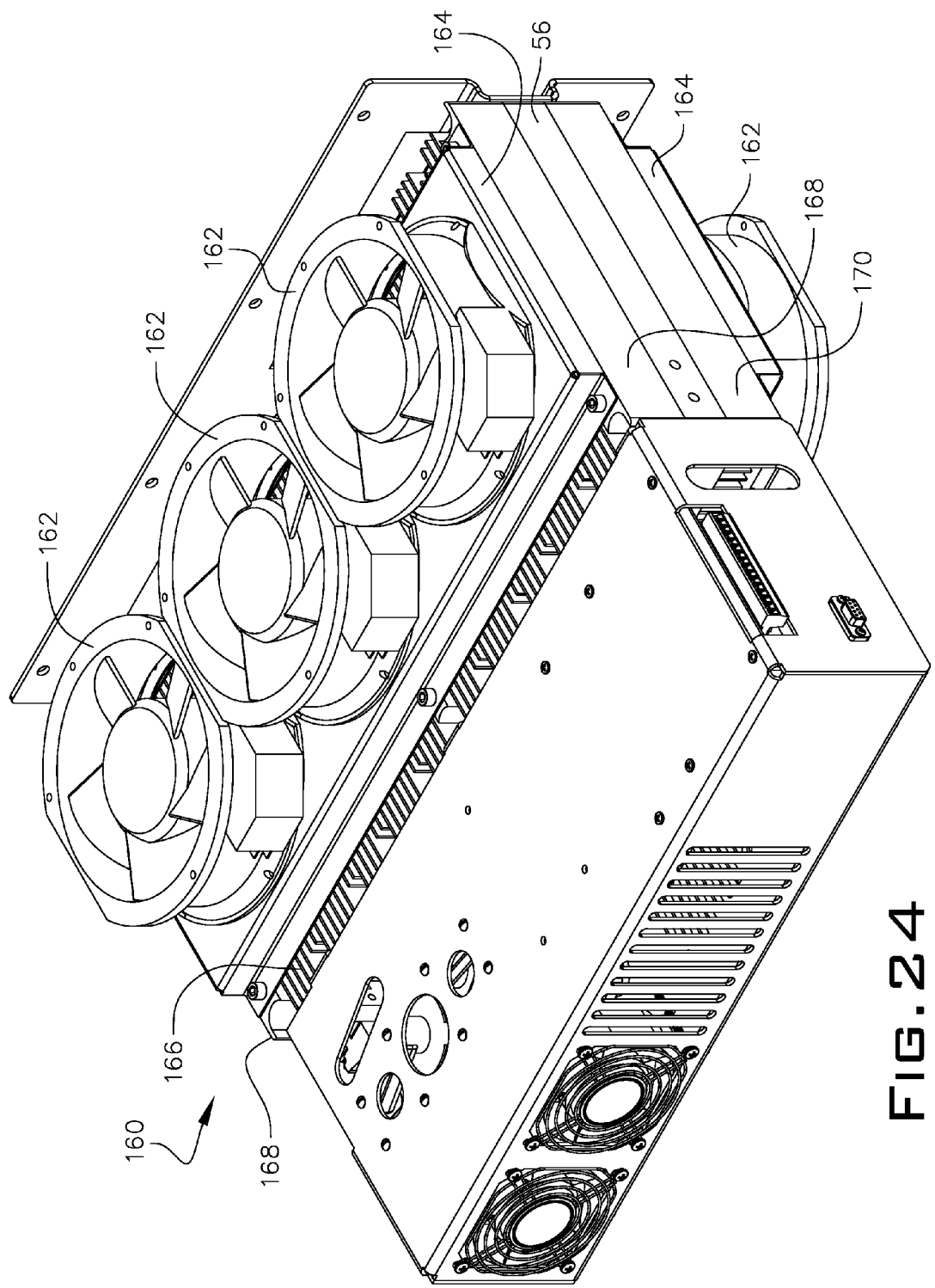
FIG. 24 is a perspective view, top to bottom, of an alternate embodiment of the present invention illustrating an air cooled system.
Figure 25:
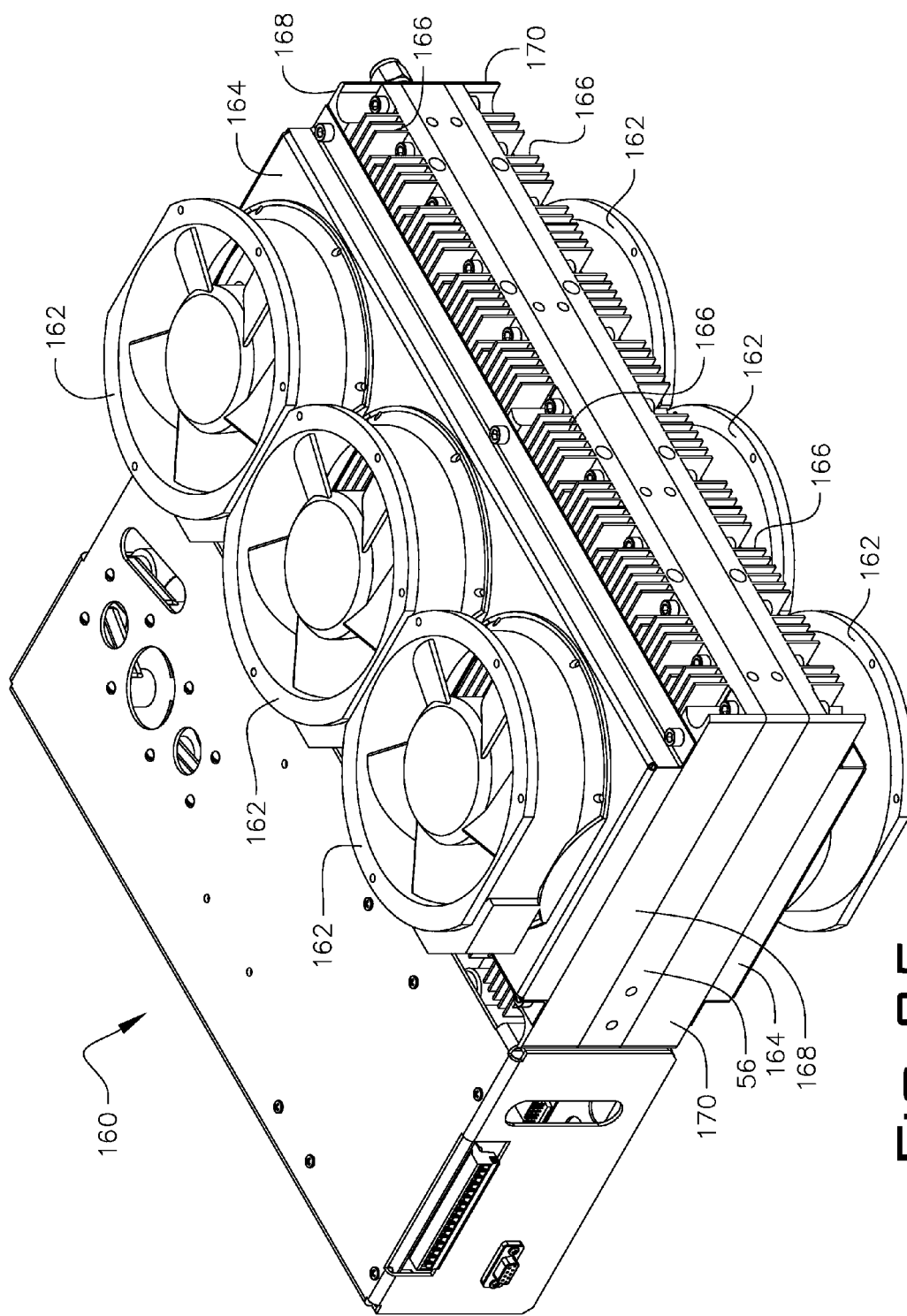
FIG. 25 is a perspective view, bottom to top, of the alternate embodiment of the present invention illustrating the air cooled system.

Referring now to FIGS. 13 and 14, it is shown how device 10 is typically orientated in a vertical position for use. A tray 104 is employed, which when filled or at least contains two or more modular devices 10 of the present invention, a rack 106 (resembling a shelf, not shown) is formed. Referring to FIG. 13, it is shown that tray 104 contains a series of slots 114 formed in a bottom surface 116 of tray 104 that are separated by a plurality of vertically disposed, frontal oriented partitions 118. These partitions serve as part of the stabilization system and provide rotational support to the module devices 10 when placed in slots in tray 104. It should be noted though that the preferred tray 104 (shown in FIGS. 22 and 23) has ten slots 114 for ten modular devices 10 and only five partitions 118 such that a first slot 114 is formed on a far left side separated by a first partition 118 and then two more slots 114 followed by a second partition 118 followed by two more slots 114 and then a third partition 118 followed by two more slots 114 and then a fourth partition 188 followed by two more slots 114 and then a fifth and final partition 118 followed by a final far right slot 114. Notwithstanding, nothing herein limits the present invention from employing a variety of different configurations for the slots and partitions, and certainly nothing herein limits the invention to just ten modular device per rack.

Figure 16:
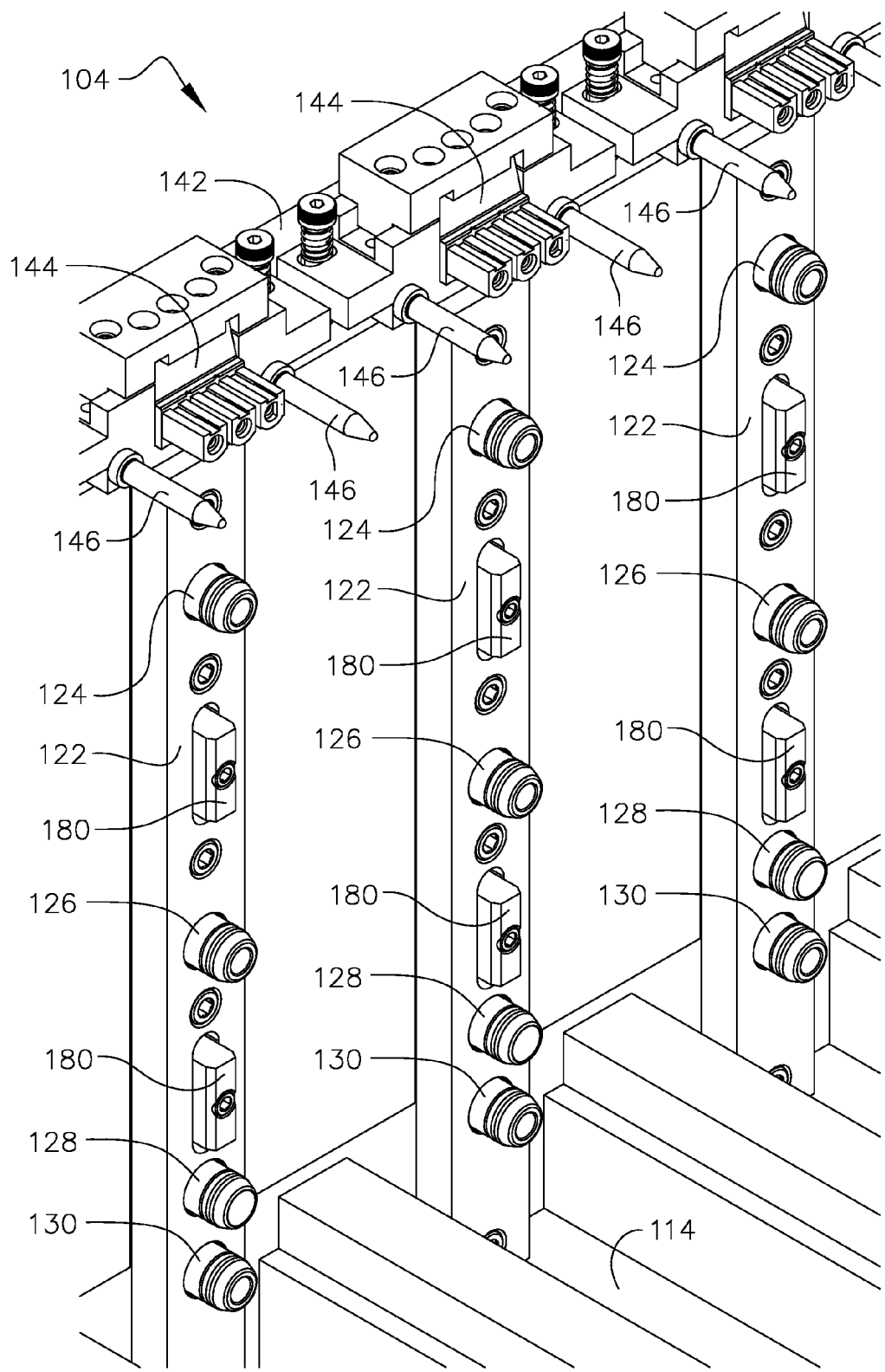
FIG. 16 is a perspective view of a back wall of the tray, in partial, showing the protuberances and the inlet and outlet ports for liquid coolant, oxygen and ozone which all flow either in or out, or in both directions in the case of the liquid coolant, along a connection rail of the modular ozone generator system of the present invention.

With reference now to FIGS. 13 and 16, it is shown that tray 104 has a back wall 120 perpendicularly disposed to bottom surface 116. Tray 104 is fabricated in the preferred embodiment from a single solid block of aluminum, although other metals can be employed and as well fastened components can be used to form tray 104. Positioned in vertical alignment along back wall 120 are a series of module connection rails 122, which are centered in each slot 114 (see FIG. 16). There are four connectors on each rail 122, one each (from top to bottom) for water-out 124, oxygen-in 126, water-in 128 and ozone-out 130. The positioning of these four connectors are not limited to this configuration but are disposed so accordingly, in this preferred embodiment to align with the reciprocal four connectors of device 10 when inserted within each slot 114 (see FIG. 17). It is noted that connectors 124, 126, 128 and 130 all "float" (i.e., they each have a small amount of play or movement) to allow for easy connection and module alignment of each device 10 in each slot 114 of tray 104. Further, there is a plurality of protuberances 180 vertically aligned within each module connection bar 120 that provide horizontal stabilization (i.e., side to side) for device 10 when inserted into a slot 144 of the tray 104. Although not shown in FIG. 13, a series of tubing is connected to each tray 104 that combines each of the four individual connectors to a single input or output, which can be seen on a left side 132 of tray 104 at (from top to bottom) water-out 134, oxygen-in 136, water-in 138 and ozone-out 140. There is also an identical set of connectors on the right side of tray 104 (not shown), which can be either plugged closed or left open to "daisy chain" a series of racks. Nothing herein requires the use of one side or the other (left or right) specifically if only one side is to be used or for that matter a hybrid of use of the openings wherein some of the openings on one side are used, while others are used on the opposed side.

Figure 15:
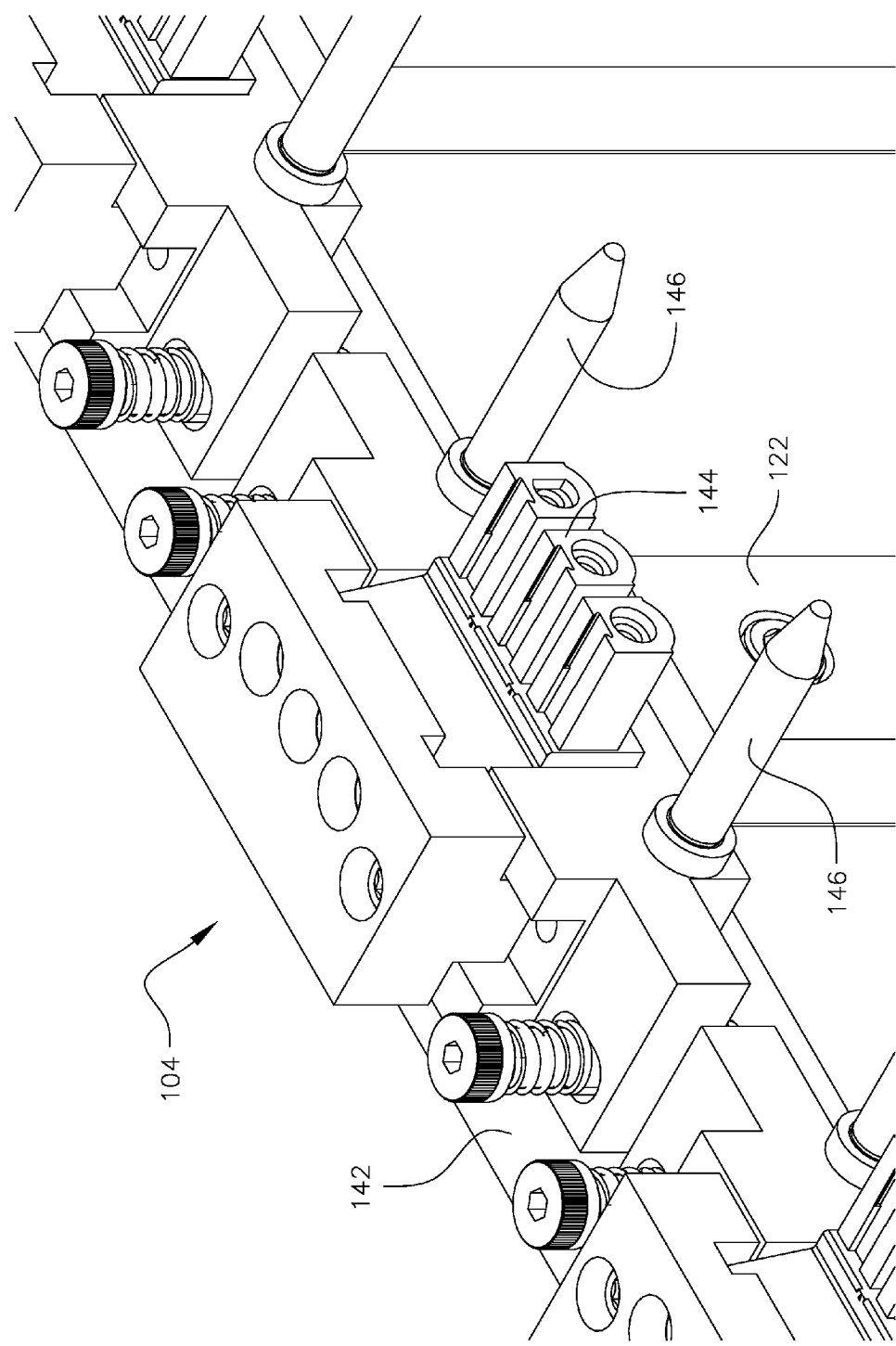
FIG. 15 is a perspective view of a top portion of the tray that retains the modular ozone generator systems, illustrating top positioning pins and an electrical connector block.

With reference now to FIGS. 15 and 16, it is shown that tray 104 has a top end 142 that supports an electrical connection block 144 for each slot 114 to connect each device 10 inserted within tray 104 to a common power source and ground and is responsible for delivery of the high power electricity to the modular devices 10 that is needed to run said device. Electrical connection block 144 can provide either be a hot, neutral and ground connection, a 3 phase connection or a DC bus. Each electrical connection block 144 is essentially axially aligned with a respective module connection bar located along the back side 120 of tray 104. Further, a pair of locator pins 146 is disposed at tray top end 142 directly below and surrounding electrical connection block 144 for aligning and securing each modular device 10 to tray 104 in each respective slot 114 when engaging module connection rails 122. Locator pins 146 extend outwardly from tray back wall 120 and are in parallel with tray bottom surface 116. Locator pins 146 and electrical connection block 144 are part of the same floating block that assists in aligning and securing each modular device 10 to tray 104 in each respective slot 114. Although a pair of locator pins 146 is used in the preferred embodiment, nothing herein limits the use of just one or more than two locator pins 146.

Referring to FIG. 17, a rear perspective view of device 10 is shown wherein a series of couplers 172, 174, 176 and 178 are connected to the water-out port 72, oxygen-in port 68, water-in port 70 and ozone-out port 74, respectively, of center body frame 58 (see FIG. 21). These four couplers, 172, 174, 176 and 178, are used in alternate embodiments wherein tray 104 is not used and instead either a separate manifold (not shown) is provided to interconnect two or more modules 10 or wherein a single module 10 is used and tubing (not shown) is directly connected to couplers 172, 174, 176 and 178.

Figure 18:
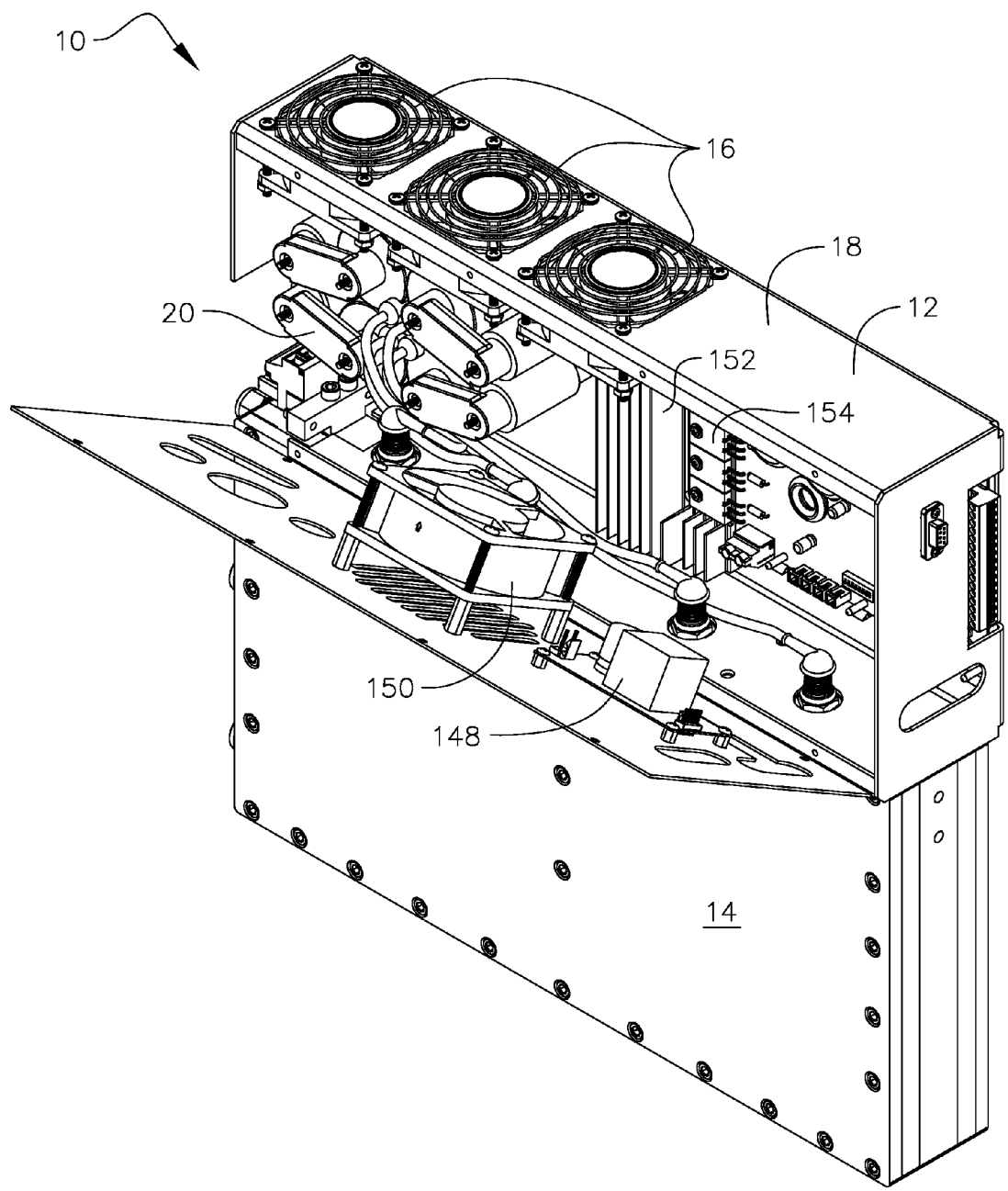
FIG. 18 is a perspective view of the modular ozone generator system of the present invention illustrating the power and control electrical system employed in the upper housing.

Referring now to FIG. 18, all of the electrical drive and power components needed to operate each device 10 are housed within top housing 12. Besides the transformer set-up 20, as previously described, there is a small power supply 148 that produces a lower voltage DC to run a circuit board and an internally disposed fan 150 that blows air onto a heat sink 152 positioned juxtaposed to the high energy producing electrical power components 154 that acts as through-puts from transformers 20 to the ozone generation cells.

Figure 19:
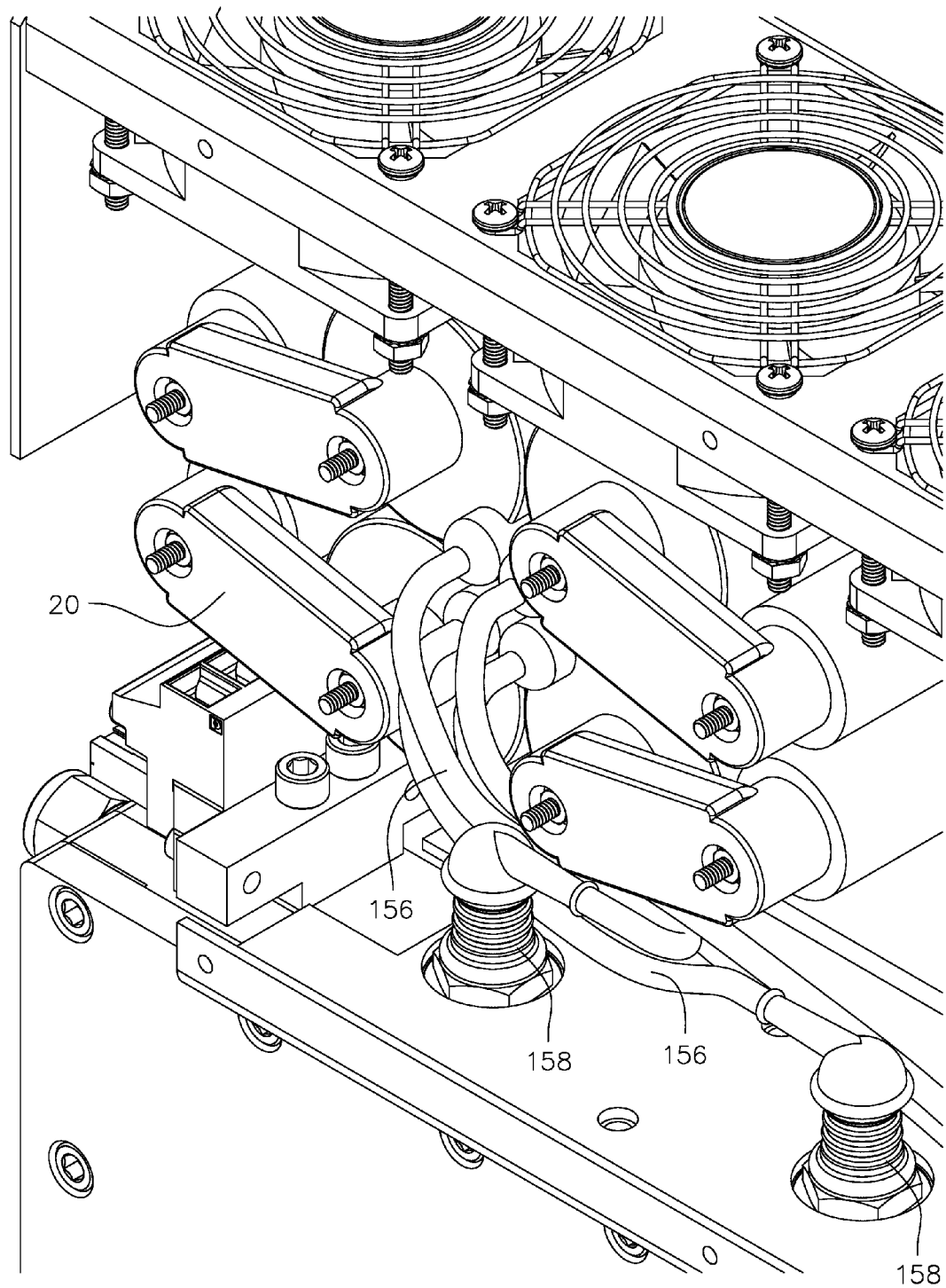
FIG. 19 is a close-up view of the transformer set-up used in the modular ozone generator system of the present invention in a preferred embodiment employed in the upper housing.
Figure 20:
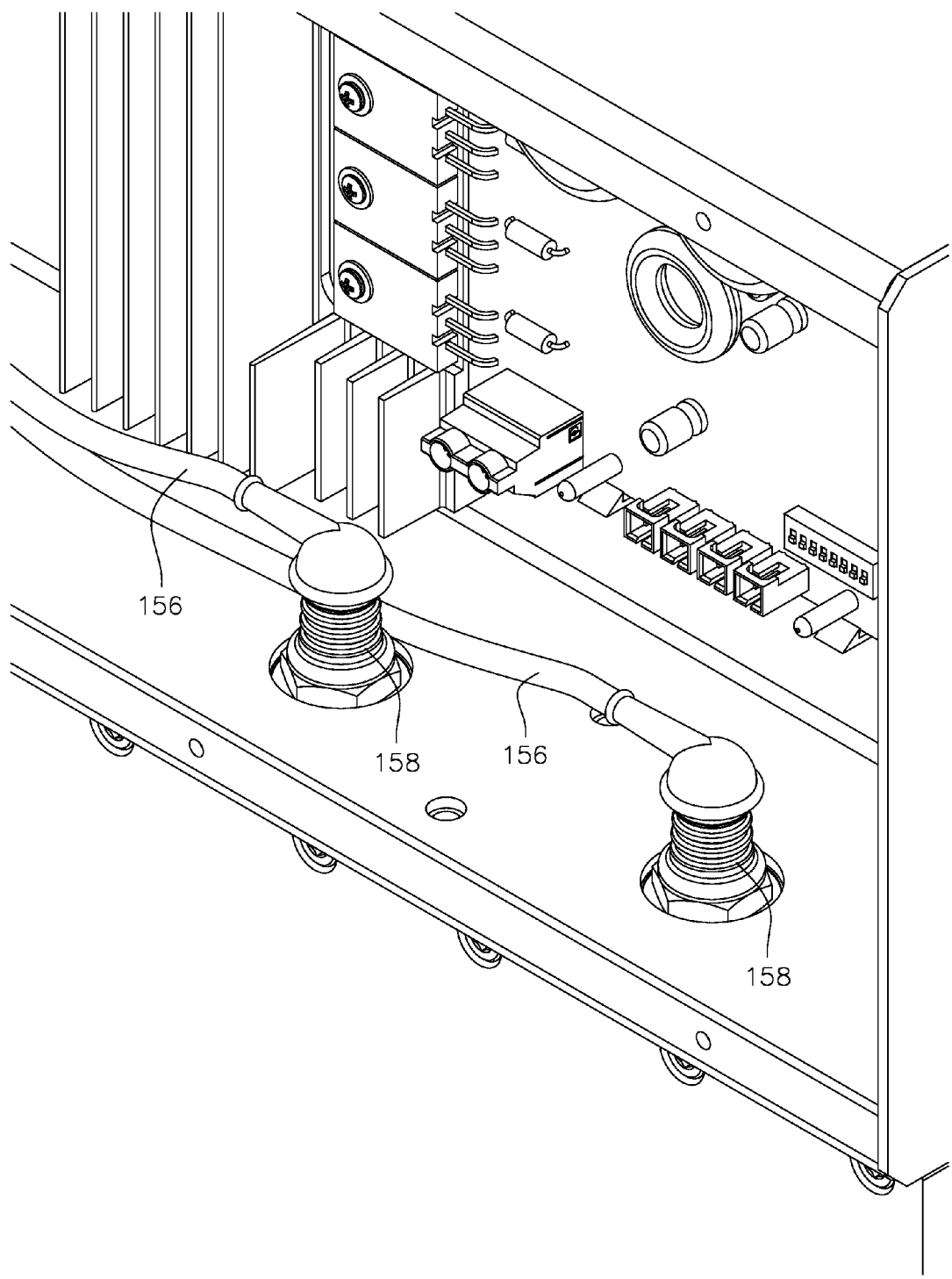
FIG. 20 shows two high voltage connector elements, one employed for each transformer, which pass the high voltage electricity needed for creation of the plasma to each ozone generator cell within the lower housing.

Referring now to FIGS. 19 and 20, the high voltage output wires 156 that come from each transformer 20 connect to individual ceramic feed-through components 158 that handle a voltage throughput in the range of 3500-4000 volts, which then delivers the high energy needed to create the plasma and eventual ozone production within each ozone generating cell. Each ceramic feed-through component 158 represents the center of each of the ozone generating cells. Since the spacing is so small between each feed-though, the novel use of the previously mentioned (and the incorporated herein by reference) Francis transformer set-up of U.S. Pat. No. 7,746,001 is preferred.

Referring now to FIGS. 24-28, an alternate embodiment device 160 of the present invention is disclosed that utilizes an air-cooled system in place of the liquid-cooled system as previously described. As such, there are no water-in or water-out ports, but instead just oxygen in 68 and ozone out 74 as seen in FIG. 28. Further, the tray (not shown) used with alternate air cooled device 160 does not employ any of the other liquid cooled parts such as water-in 128 and water-out 124 in module connection bar 122 nor water-in 136 and water-out 140 located on the left tray side 132. However all of the oxygen supply and ozone-out ports remain.

Figure 26:
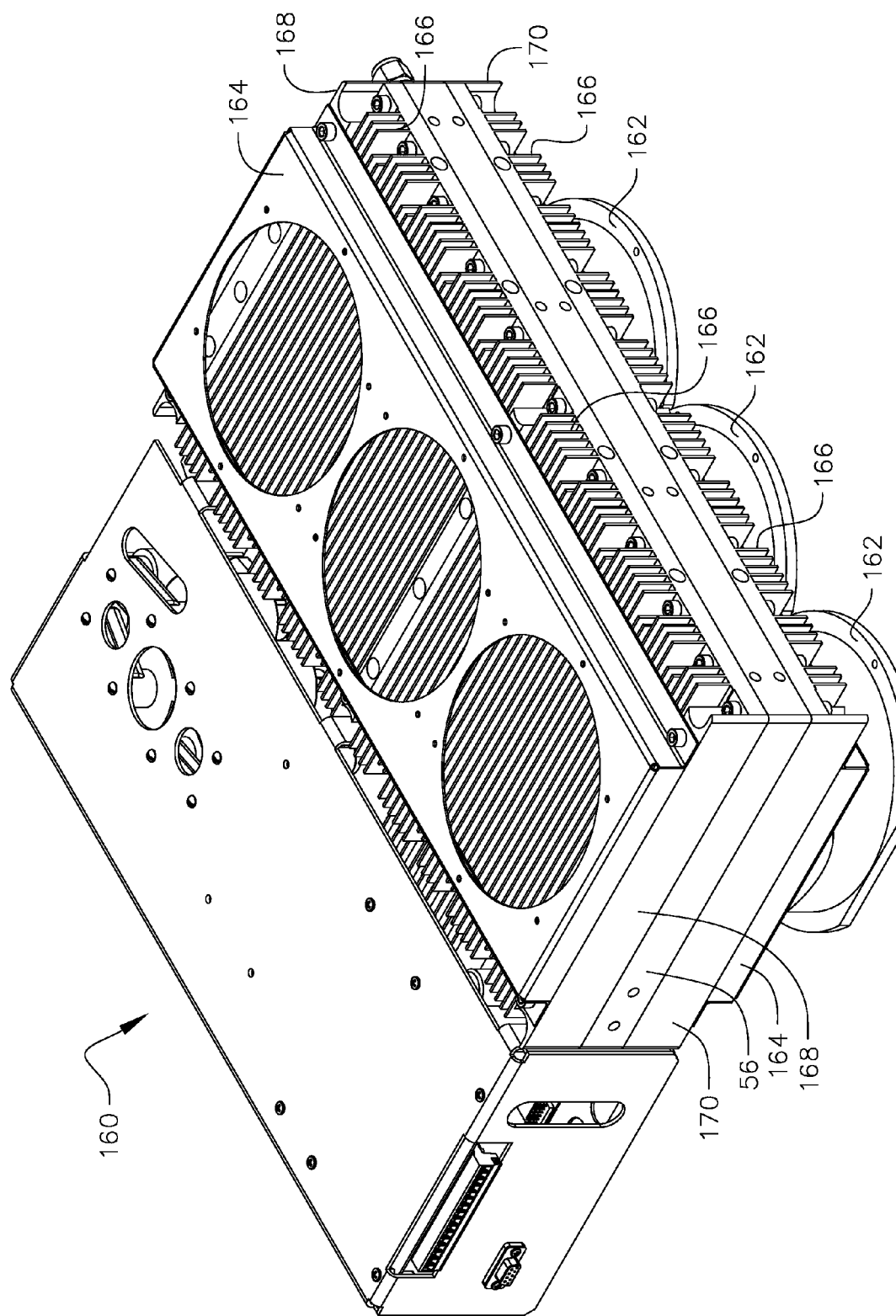
FIG. 26 is a perspective view, bottom to top, of the same alternate embodiment of the present invention illustrating the air cooled system, but with one set of fans removed so that a fan retaining frame can be seen.
Figure 27:
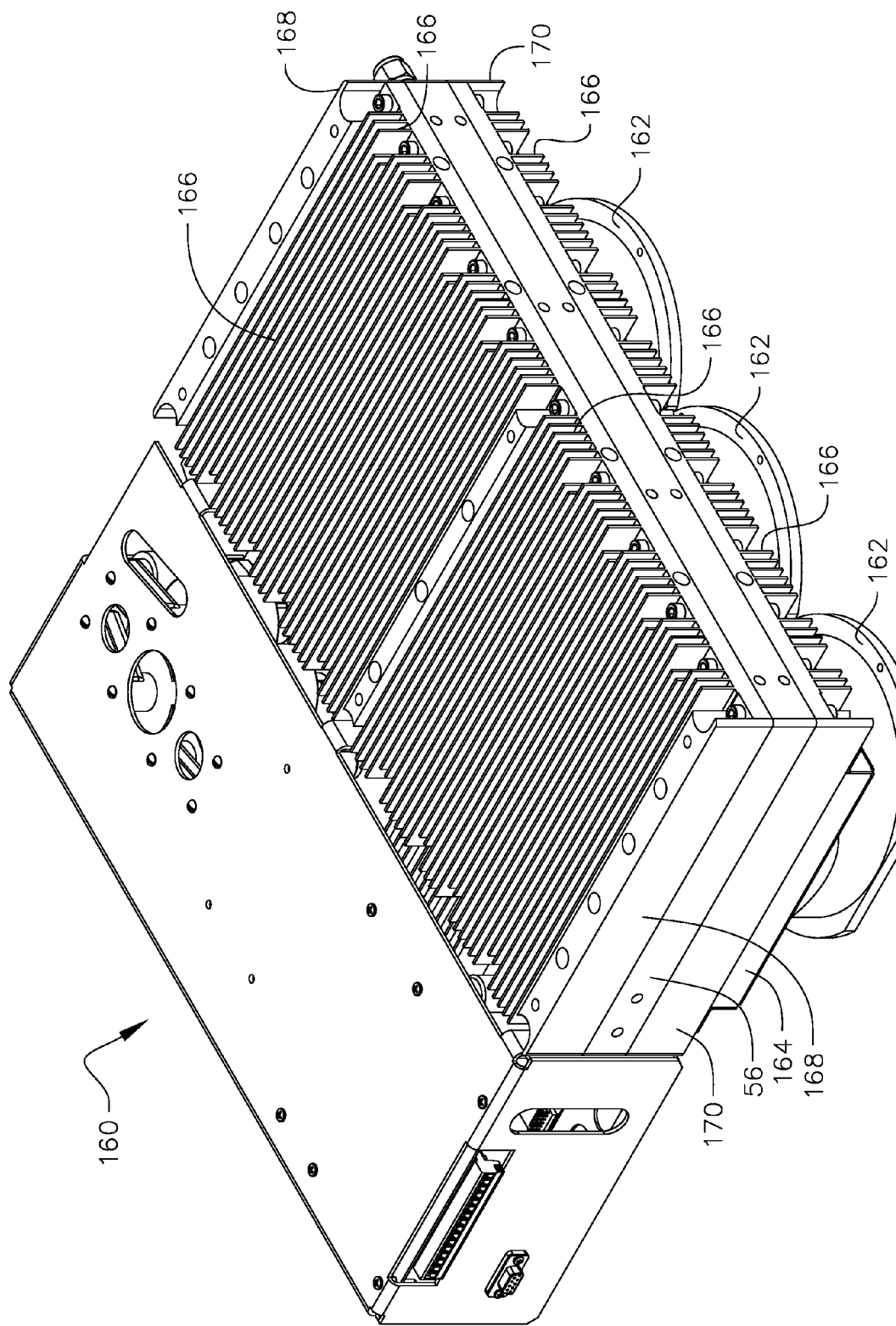
FIG. 27 is a perspective view, bottom to top, of the same alternate embodiment of the present invention illustrating the air cooled system, but with one set of fans and the fan retaining frame removed so that two heat sinks can be seen.

Further, as to alternate device 160, the water inlets 40, the water circulation areas 42 and the water manifold 44 are also not employed within the module. Instead, as shown in FIGS. 24-28, an air-cooled system including a plurality of large capacity fans 162 are employed on both sides of the module. As shown in FIG. 26, a fan mounting frame 164 is employed underneath fans 162 to locate them directly above a pair of large capacity heat sinks, of which both are more clearly seen in FIG. 27. Both the fan mounting frame 164 and the pair of large capacity heat sinks 166 are employed on both sides of the module.

As can also be appreciated by referring to FIGS. 24-28, the five layer system of the preferred embodiment device 10 is not employed with alternate device 160, but instead merely a three layer system. What remains common is that both embodiments employ center body frame 56. And as seen in FIG. 28, center body frame 56 houses the ozone generation cells much to the same configuration as seen in the preferred device 10 of FIGS. 5 and 6, absent any liquid coolant components. The remaining components are employed in the air-cooled alternate embodiment as shown in FIGS. 24-28. For avoidance of doubt, the three layer configuration of alternate device 160 is clearly seen in FIGS. 24-27 and the section layers that surround center body frame 56 are end potions 168 and 170 of the upper and lower heat sinks 166. It should also be noted that alternate embodiment 160 has been described to have upper and lower heat sink portions, 168 and 170 respectively. However, it is understood that when alternate device 160 is orientated for use in a vertical position that lower heat sink end portion 170 is on a left side of device 160 while upper heat sink end portion 168 is on the right side thereof.

Equivalent elements can be substituted for the ones set forth herein to achieve the same results in the same way and in the same manner.

Having thus described the present invention in the detailed description of the preferred embodiment, what is desired to be obtained in Letters Patent is:

1. An ozone generation system comprising:
   at least one modular ozone generating device having an upper housing and lower housing;
   the upper housing enclosing electrical components for providing high energy power to at least one ozone generator cell within said device to produce an ozone generation output;
   the lower housing wherein a multiplicity of section layers are located enclosing the at least one ozone generator cell and including a means for cooling the at least one ozone generator cell;
   the at least one ozone generator cell comprising at least one plasma generation pathway;
   a plurality of ports formed in one of the multiplicity of section layers of the lower housing;
   said plurality of ports including a water-in port, a water-out port, an oxygen-in port and an ozone-out port;
   an ozone micro-channel network located in the at least one ozone generator cell wherein a plasma reaction occurs to produce ozone;
   said ozone micro-channel network having an orifice located thereon for maintaining a known and controllable pressure drop across said at least one ozone generator cell; and
   said ozone micro-channel network and orifice being located between the oxygen-in port and the ozone-out port.

2. The ozone generation system of claim 1, wherein the at least one modular ozone generating device comprises two or more modular ozone generating devices.

3. The ozone generation system of claim 2, wherein the two or more modular ozone generating devices are supported on a tray for forming a rack of modular ozone generating devices working in coincidence.

4. The ozone generation system of claim 3, wherein the tray comprises a horizontal base plate having a plurality of slots and a multiplicity of barrier plates separating at least every other slot and an upstanding back wall having a plurality of module connection bars, one each for each slot, for receiving a single modular ozone generating device, the module connection bars each having a plurality of reciprocal couplers for receiving the plurality of ports formed in the one of the multiplicity of section layers of the lower housing.

5. The ozone generation system of claim 4, wherein the tray further comprises an electrical connection block for each of the plurality of slots disposed at a top end of the tray for electrically coupling with a modular ozone generation device inserted into each slot, and the tray further comprising a pair of locator pins for each slot extending outwardly from the top end of the tray in parallel with the tray base plate and surrounding the electrical block for assisting in the location of the modular ozone generation device when inserted within each respective slot.

6. The ozone generation system of claim 5, wherein the electrical connection block and the pair of locator pins for each of the plurality of slots float for permitting a weight load of a module ozone generation device to be more evenly dispersed about the electrical block when inserted within each respective tray slot.

7. The ozone generation system of claim 4, wherein the plurality of reciprocal couplers for receiving the plurality of ports of each module connection bar float for permitting a weight load of a module ozone generation device inserted into a tray slot to be more evenly dispersed about each coupler.

8. The ozone generation system of claim 4, wherein the tray further comprises at least one protuberance disposed along each module connection bar for assisting in the location of the module ozone generation device when inserted into each tray slot such that any side to side movement of the modular ozone generation device inserted therein is minimized.

9. The ozone generation system of claim 1, wherein the lower housing comprises five section layers and wherein the means for cooling the at least one ozone generator cell is a liquid coolant system enclosed within the lower housing.

10. The ozone generation system of claim 9, further comprising a manifold system that combines the ports for the water-in, water-out, oxygen-in and ozone-out from each of two or more modular ozone generating devices from the at least one modular ozone generating device into a single tube for each port thereof.

11. The ozone generation system of claim 10, wherein the manifold system is integrated into a tray.

12. The ozone generation system of claim 9, wherein the liquid coolant system enclosed within the lower housing includes at least one liquid coolant labyrinth for each of the at least one ozone generator cells.

13. The ozone generation system of claim 1, wherein the at least one ozone generator cell comprises two separate ozone generation pathways and wherein a single oxygen input supplies the oxygen to the at least one modular ozone generating device and a single high voltage throughput supplies the high energy power to produce ozone.

14. The ozone generation system of claim 1, further comprising a pressure equalization system, one each for the at least one ozone generation cell.

15. The ozone generation system of claim 14, further comprising a plurality of locator devices employed within a center body framing element of the at least one modular ozone generating device for positioning a pair of ceramic plates and a pair of stainless steel plates of the at least one modular ozone generating device to form the pressure equalization system.

16. The ozone generation system of claim 1, wherein a high frequency alternating current is applied to the at least one modular ozone generating device to produce the ozone.

17. The ozone generation system of claim 1, wherein the at least one modular ozone generating device has four separate ozone generating cells within the lower housing.

18. The ozone generation system of claim 1, wherein the lower housing comprises three section layers and wherein the means for cooling the at least one ozone generator cell is an air-cooling system surrounding a center layer of the three section layers.

19. The ozone generator system of claim 18, wherein opposed outer layers surrounding the center layer comprise heat sinks.

20. The one generator system of claim 19, further comprising a plurality of fans mounted on outer surfaces of the heat sinks.

21. An ozone generation system comprising:
two or more modular ozone generating devices, each device having an upper housing and lower housing;
the upper housing enclosing electrical components for providing high energy power to a plurality ozone generator cells within each device to produce an ozone generation output for each device;
the lower housing wherein a multiplicity of section layers are located enclosing the plurality ozone generator cells and including a means for cooling the plurality of ozone generator cells;
each of the plurality of ozone generator cells comprising two separate plasma generation pathways;
a plurality of ports formed in one of the multiplicity of section layers of the lower housing;
said plurality of ports including a water-in port, a water-out port, an oxygen-in port and an ozone-out port;
an ozone micro-channel network located in each of the plurality of the ozone generator cells wherein plasma reactions occur to produce ozone;
said ozone micro-channel network having an orifice located thereon for maintaining a known and controllable pressure drop across each ozone generator cell; and
said ozone micro-channel network and orifice being located between the oxygen-in port and the and the ozone port;
wherein the means for cooling each of the two or more ozone generator cells is a liquid coolant system enclosed within the lower housing.

22. The ozone generation system of claim 21, wherein the two or more modular ozone generating devices are supported on a tray for forming a rack of modular ozone generating devices working in coincidence, the rack of the system including at least one tray.

23. The ozone generation system of claim 21, wherein the liquid coolant system comprises a liquid cooling labyrinth for each separate plasma generation pathway on each of the plurality of the ozone generator cells.

24. The ozone generation system of claim 21, further comprising a manifold system that combines the ports for the water-in, water-out, oxygen-in and ozone-out from each of the two or more modular ozone generating devices into a single tube for each port thereof.

25. The ozone generation system of claim 24, wherein the manifold system is integrated into a tray.

26. The ozone generation system of claim 25, wherein the tray comprises a horizontal base plate having a plurality of slots and a multiplicity of barrier plates separating at least every other slot and an upstanding back wall having a plurality of module connection bars, one each for each slot, for receiving a single modular ozone generating device, the module connection bars each having a plurality of reciprocal couplers for receiving the plurality of ports formed in the one of the multiplicity of section layers of the lower housing.

27. The ozone generation system of claim 26, wherein the tray further comprises an electrical connection block for each of the plurality of slots disposed at a top end of the tray for electrically coupling with a modular ozone generation device inserted into each slot, and a pair of locator pins for each slot extending outwardly from the top end of the tray in parallel with the tray base plate and surrounding the electrical block for assisting in the location of the modular ozone generation device when inserted within each respective slot.

28. The ozone generation system of claim 27, wherein the electrical connection block and the pair of locator pins for each of the plurality of slots float for permitting a weight load of a module ozone generation device to be more evenly dispersed about the electrical block when inserted within each respective tray slot.

29. The ozone generation system of claim 26, wherein the plurality of reciprocal couplers for receiving the plurality of ports of each module connection bar float for permitting a weight load of a module ozone generation device inserted into a tray slot to be more evenly dispersed about each coupler.

30. The ozone generation system of claim 26, wherein the tray further comprises at least one protuberance disposed along each module connection bar for assisting in the location of the module ozone generation device when inserted into each tray slot such that any side to side movement of the modular ozone generation device inserted therein is minimized.

31. The ozone generation system of claim 21, wherein a single oxygen input supplies the oxygen and a single high voltage throughput supplies the high energy power to produce ozone to each of the two separate ozone generating pathways of each of the plurality ozone generating cells within each of the two or more modular ozone generating devices.

32. The ozone generation system of claim 21, further comprising a pressure equalization system for each ozone generating cell in each modular ozone generating device, the pressure equalization system including a plurality of locator devices employed within a center body framing element of each modular ozone generating device for positioning a pair of ceramic plates and a pair of stainless steel plates having springs attached upon a top surface thereof.

33. The ozone generation system of claim 21, wherein each of the two or more modular ozone generating devices has four separate ozone generating cells within the lower housing.

34. The ozone generation system of claim 21, wherein the lower housing comprises three section layers and the means for cooling the plurality of ozone generator cells is an air-cooling system surrounding a center layer of the three section layers, and wherein opposed outer layers surround the center layer which comprises a plurality of heat sinks and a plurality of fans mounted on outer surfaces of the heat sinks.

* * * * *